(12) United States Patent
Cooper et al.

(10) Patent No.: US 12,267,806 B2
(45) Date of Patent: Apr. 1, 2025

(54) DISTRIBUTED GENERATION OF REAL-TIME LOCATION

(71) Applicants: DENSO International America, Inc., Southfield, MI (US); DENSO CORPORATION, Kariya (JP)

(72) Inventors: Kyle Cooper, Plainwell, MI (US); Eric Smith, Holland, MI (US)

(73) Assignees: DENSO International America, Inc., Southfield, MI (US); DENSO CORPORATION, Kariya-sha (JP)

( * ) Notice: Subject to any disclaimer, the term of this patent is extended or adjusted under 35 U.S.C. 154(b) by 407 days.

(21) Appl. No.: 17/896,207

(22) Filed: Aug. 26, 2022

(65) Prior Publication Data

US 2023/0075008 A1    Mar. 9, 2023

Related U.S. Application Data

(60) Provisional application No. 63/240,392, filed on Sep. 3, 2021.

(51) Int. Cl.
*H04W 4/40*    (2018.01)
*G01S 5/02*    (2010.01)
*G01S 5/06*    (2006.01)
*H04W 64/00*    (2009.01)

(52) U.S. Cl.
CPC ......... *H04W 64/003* (2013.01); *G01S 5/0252* (2013.01); *G01S 5/06* (2013.01)

(58) Field of Classification Search
CPC ......... H04W 4/02; H04W 4/023; H04W 4/40; H04W 4/80; H04W 12/08; H04W 12/63; H04W 24/10; H04W 4/029; H04W 4/38; H04W 64/00; H04W 8/245
USPC ........ 455/456.1, 456.3, 419, 402, 67.7, 557, 455/100, 411
See application file for complete search history.

(56) References Cited

U.S. PATENT DOCUMENTS

| | | | |
|---|---|---|---|
| 11,212,642 B2* | 12/2021 | Ledvina | G07C 9/29 |
| 11,218,836 B1* | 1/2022 | Ilieva | H04W 4/021 |
| 11,521,434 B2* | 12/2022 | Vaccariello | H01Q 1/242 |
| 12,115,934 B2* | 10/2024 | Fernandes | G07C 9/00309 |
| 2009/0284474 A1* | 11/2009 | Komaki | B60K 35/10 |
| | | | 345/1.3 |
| 2015/0082089 A1* | 3/2015 | Jiang | G06F 11/3003 |
| | | | 714/25 |
| 2017/0232974 A1* | 8/2017 | Nishida | B60W 60/0053 |
| | | | 701/24 |
| 2019/0180545 A1* | 6/2019 | Tsujimura | G06Q 10/0832 |
| 2020/0064444 A1* | 2/2020 | Regani | G01S 7/006 |
| 2020/0257284 A1* | 8/2020 | Hassani | B60W 50/10 |
| 2020/0406860 A1* | 12/2020 | Mai | B60R 25/31 |
| 2022/0095085 A1* | 3/2022 | Volkerink | H04W 56/001 |
| 2022/0308195 A1* | 9/2022 | Zeng | G01S 13/003 |
| 2023/0021342 A1* | 1/2023 | Wang | A61B 5/0507 |
| 2023/0104188 A1* | 4/2023 | Zilberman | G01P 21/00 |
| | | | 701/33.1 |

(Continued)

*Primary Examiner* — Joseph Arevalo
(74) *Attorney, Agent, or Firm* — Warner Norcross + Judd LLP

(57) ABSTRACT

A system and method for determining location information of a portable device relative to an object is provided. In one embodiment, aspects of the system to determine location with respect to the portable device may be distributed among more than one device in the system.

20 Claims, 15 Drawing Sheets

(56) References Cited

U.S. PATENT DOCUMENTS

| | | | |
|---|---|---|---|
| 2023/0242071 A1* | 8/2023 | Yamada | G08G 1/0962 |
| | | | 701/2 |
| 2023/0256937 A1* | 8/2023 | Zhang | G07C 9/00309 |
| | | | 340/5.7 |
| 2023/0373437 A1* | 11/2023 | Baruco | B60R 25/305 |
| 2024/0053428 A1* | 2/2024 | Wahl | G01S 5/02213 |

* cited by examiner

DISTRIBUTED GENERATION OF REAL-TIME LOCATION

FIELD OF THE INVENTION

The present application relates to a system and method for determining location information with respect to a portable device and an object, such as a vehicle.

BACKGROUND

Real-time location or position determinations for objects have become increasingly prevalent across a wide spectrum of applications. Real-time locating systems (RTLS) are used and relied on for tracking objects, such as portable devices, in many realms including, for example, automotive, storage, retail, security access for authentication, and security access for authorization.

One conventional RTLS in the automotive realm includes a transceiver or master controller located within a vehicle and capable of communicating via radio frequency (RF) with a portable device. One or more aspects of the communications between the master controller and the portable device, such as signal strength of the communications, angle of arrival, time of flight, and/or others, may be monitored and used as a basis for determining a location of the portable device relative to the vehicle. For instance, if the signal strength of communications is low, the portable device may be farther away from the vehicle relative to communications where the signal strength is high. In general, the strength of communications drops off as the distance increases between the portable device and the vehicle. For instance, the angle of signals may be measured by one or more antennas, from which the position of the portable device may be determined using angulation (such as triangulation) or other techniques (which side of the antenna, machine learning, etc.). For instance, the time of flight of signals may be measured by one or more antennas, from which the distance of a portable device may be determined. In general, the time of flight increases as the distance increases between the portable device and the vehicle. Based on this or other measurements of a signal characteristic of communications, a location of the portable device may be determined.

SUMMARY

A system and method for determining location information of a portable device relative to an object is provided.

In general, one innovative aspect of the subject matter described herein can be embodied in a system for determining a location of a portable device relative to an object. The system may include a first object device and a second object device disposed in fixed positions relative to the object. Each of the first and second object devices may include an antenna configured to receive communications wirelessly transmitted from the portable device. The first object device may include a first device controller configured to determine first location information about the portable device relative to the object, and where the first device controller may include a first device locator configured to determine the first location information based on a first signal characteristic of communications transmitted from the portable device. The second object device may include a second device controller configured to determine second location information about the portable device relative to the object, and where the second device controller may include a second device locator configured to determine the second location information based on a second signal characteristic of communications transmitted from the portable device. The location of the portable device relative to the object may be determined based on the first and second location information determined respectively by the first and second device locators of the first and second object devices.

The foregoing and other embodiments can each optionally include one or more of the following features, alone or in combination. In particular, one embodiment includes all the following features in combination.

In some embodiments, the first signal characteristic may be a first type and the second signal characteristic is a second type different from the first type.

In some embodiments, the first signal characteristic may be based on a first type of communications transmitted from the portable device, and the second signal characteristic may be based on a second type of communications transmitted from the portable device.

In some embodiments, the first type of communications may be BTLE communications, and the second type of communications may be UWB communications.

In some embodiments, the first object device may be operable to receive communications transmitted from the portable device and to determine the first signal characteristic based on the communications received from the portable device. The first object device may be operable to receive a third signal characteristic from another device. The first device locator may be configured to determine the first location information based on the first signal characteristic and the third signal characteristic. The first signal characteristic and the third signal characteristic may be the first type of communications.

In some embodiments, the other device may be the second object device. The second object device may be operable to receive communications transmitted from the portable device and to determine the second signal characteristic based on the communications received from the portable device. The second object device may be operable to receive a fourth signal characteristic from the first object device. The second device locator may be configured to determine the second location information based on the second signal characteristic and the fourth signal characteristic. The second signal characteristic and the fourth signal characteristic may be the second type of communications.

In some embodiments, the system may include a primary object device having a primary device controller with a primary device locator. The primary device locator may be configured to determine the location based on the first location information and the second location information.

In some embodiments, a third object device may be disposed in fixed positions relative to the object. The third object device may include an antenna configured to receive communications wirelessly transmitted from the portable device. The third object device may include a third device controller configured to determine third location information about the portable device relative to the object. The third device controller may include a third device locator configured to determine the third location information based on a third signal characteristic of communications transmitted from the portable device. The location of the portable device relative to the object may be determined based on the first, second, and third location information determined respectively by the first, second, and third device locators of the first, second, and third object devices.

In some embodiments, the first device locator may be configured to determine the first location information based on multilateration of a plurality of signal characteristics indicative of signal strength of communications received from the portable device, where the first signal characteristic is included in the plurality of signal characteristics.

In some embodiments, the second device locator may be configured to determine the second location information based on heuristic fingerprinting of a plurality of signal characteristics. The second signal characteristic may be included in the plurality of signal characteristics.

In some embodiments, the second device locator may be configured to determine the second location information based on output from a machine trained model. A plurality of signal characteristics may be provided as inputs to the machine trained model, where the second signal characteristic may be included in the plurality of signal characteristics.

In some embodiments, the first device locator may be configured to determine the first location information based on output from a first machine trained model. The second device locator may be configured to determine the second location information based on output from a second machine trained model. The first machine trained model may be operable to provide output indicative of position information for the portable device with respect to the object. The second machine trained model may be operable to provide output indicative of a zone classification for the portable device with respect to the object.

In general, one innovative aspect of the subject matter described herein can include a method of determining location of the portable device relative to an object. The method may include generating, by a first locator of a first object device, first location information about the portable device relative to the object based on communications with the portable device, and generating, by second locator of a second object device, second location information about the portable device relative to the object based on communications with the portable device. The method may include generating location information about the portable device relative to the object based on the first and second location information determined respectively by the first and second locators of the first and second object devices.

The foregoing and other embodiments can each optionally include one or more of the following features, alone or in combination. In particular, one embodiment includes all the following features in combination.

In some embodiments, generating the first location information may include determining the first location information based on a first signal characteristic of communications transmitted from the portable device.

In some embodiments, the communications transmitted from the portable device may be communicated in conjunction with a communication link established between the portable device and an object device other than the first object device.

In some embodiments, generating the second location information may include determining the second location information based on a second signal characteristic of communications transmitted from the portable device.

In some embodiments, the communications transmitted from the portable device may be communicated in conjunction with a communication link established between the portable device and an object device other than the second object device.

In some embodiments, the first and second locators may be different such that a core function of the first and second locators are different.

In general, one innovative aspect of the subject matter described herein can be embodied in a locator system operable to determine a location of a portable device relative to an object. The locator system may include a first locator configured to generate first location information based on communications with the portable device. The locator system may include a second locator configured to generate second location information based on communications with the portable device. The locator system may include a combiner operable to receive the first location information and the second location information. The combiner may be configured to generate location information indicative of the location of the portable device relative to the object based on the first location information and the second location information. The first locator and the second locator may be provided in separate devices disposed at first and second respective positions on the object.

The foregoing and other embodiments can each optionally include one or more of the following features, alone or in combination. In particular, one embodiment includes all the following features in combination.

In some embodiments, the first locator may determine the first location information based on a first signal characteristic of communications transmitted from the portable device. The second locator may determine the second location information based on a second signal characteristic of communications transmitted from the portable device.

In some embodiments, the first locator and the second locator may be operable to determine respectively the first and second location information based on different types of communications transmitted from the portable device.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION

Figure 1:
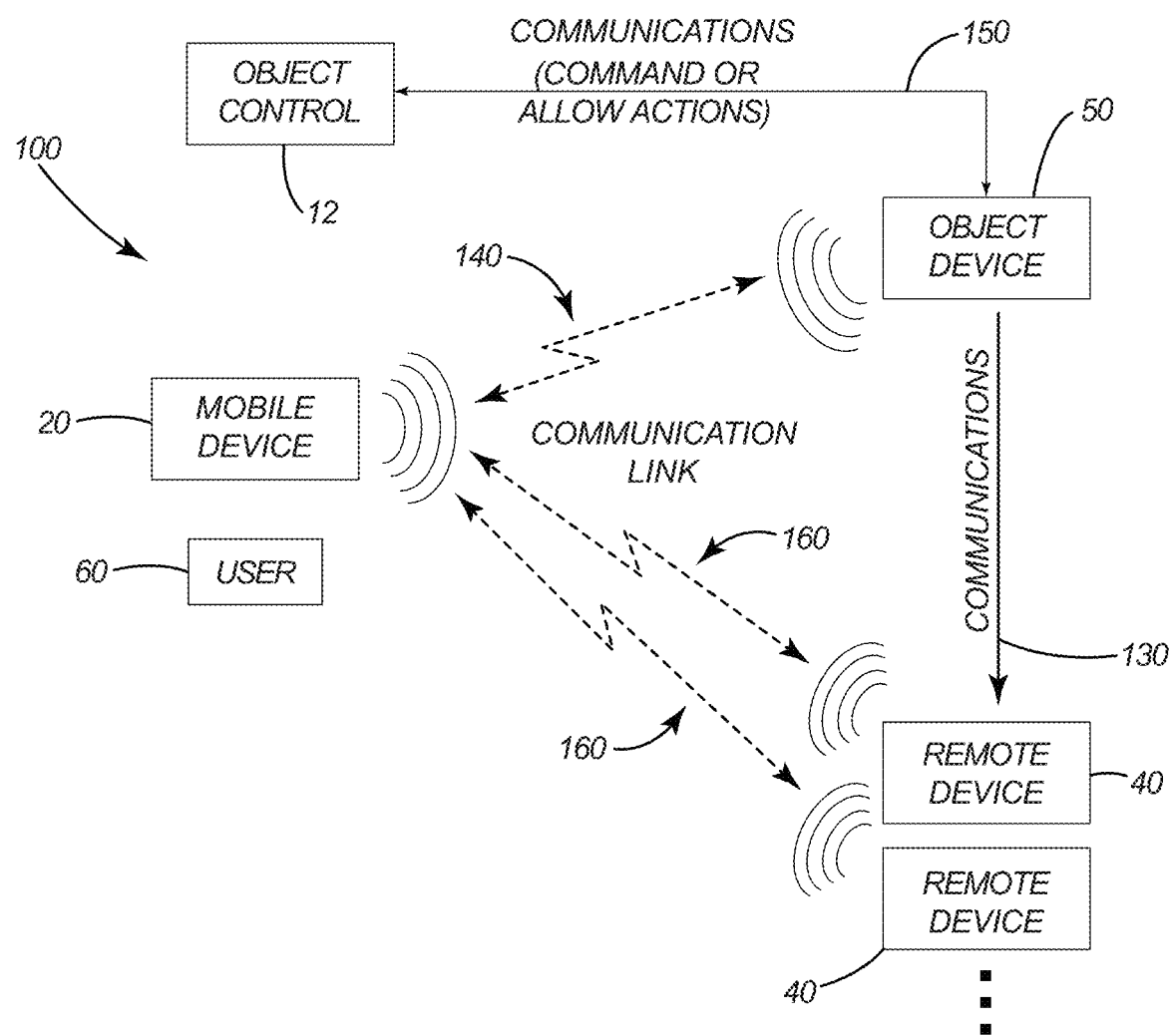
FIG. 1 shows a system in accordance with one embodiment.

A system and method for determining location information of a portable device relative to an object and controlling operation of an object based on the location information is provided.

The system may include a plurality of remote devices disposed on the object and capable of obtaining sensor information with respect to communications with the portable device. The communications may be between the portable device and a device other than the remote devices or the communications may be between the portable device and one or more of the remote devices, or a combination thereof. One or more aspects of the sensor information may be obtained directly by a remote device or may be communicated to the remote device, or a combination thereof.

In one embodiment, a locator system may be provided within the overall system that is capable of determining a location of the portable device relative to the object. Aspects of the locator system may be distributed among the plurality of remote devices, such that a determination of the location of the portable device may be achieved in a distributed manner. A combiner or aggregator of outputs from a plurality of locators provided in the locator system may be operable to generate location information indicative of the location of the portable device relative to the object 10.

In one aspect, a localization system may be provided for passive access that includes multiple remote devices where the determination of a mobile device with respect to an object (e.g., an automobile, a building etc.) is distributed among multiple remote devices. The remote devices can include UWB radios, BLE radio, NFC readers or any type of RF antenna for interfacing with a mobile device.

Any number of localization algorithms can be used for determining where the mobile device (smart phone, key fob, etc.) is in relation to the object. Classes of algorithms include multilateration, fingerprinting/heuristics and machine learning. The algorithms may take, as input, data reflective of how far the mobile device is from each of the remote devices and convert that information into an estimate of where the mobile device is with respect to the object.

The instantiation of the localization algorithms may push the computational boundaries of a single computing device in the localization system. The localization system in one embodiment may provide a series of adjacent and computationally simpler problems and then combine these solutions into a localization estimate.

For example, one remote device might only perform multilateration calculations and determine a Cartesian coordinate estimate of the mobile device. A second remote device may perform a heuristics fingerprinting operation on UWB ranging data, and a third device may perform a heuristics fingerprinting operation on BLE RSSI data. Then, the three results can be combined to generate a final localization estimate that includes both a zone determination and a position estimate from both UWB and BLE data.

In another example, three remote devices can be configured each with a separate ML model loaded in flash memory. A first ML model may include two possible outputs: inside and outside the object (e.g., vehicle). A second ML model may include five possible outputs: front driver side seat, rear driver side seat, front passenger side seat, rear passenger side seat, and trunk. Other interior zones are possible depending on the interior configuration of the object. A third ML model may include a set of outputs for the various zones placed outside the vehicle. During a localization operation, the first remote device can determine if the mobile device is located within the vehicle. Then, depending upon the result, either the second or third remote device can determine exactly which zone the mobile device is located within. In this way, the model can be kept small enough to fit in memory accessible to each remote device's processor whereas a model that includes all possible zones will not fit.

In an alternative embodiment, aspects of the localization processing may be conducted in the cloud or on the mobile device itself. In a larger commercial vehicle (busses, trains, etc.) partitioning of the processing may include off-loading work from busy nodes (remote devices where there are lots of mobile devices) to less busy nodes (remote devices located where there are fewer mobile devices).

I. System Overview

Figure 2:
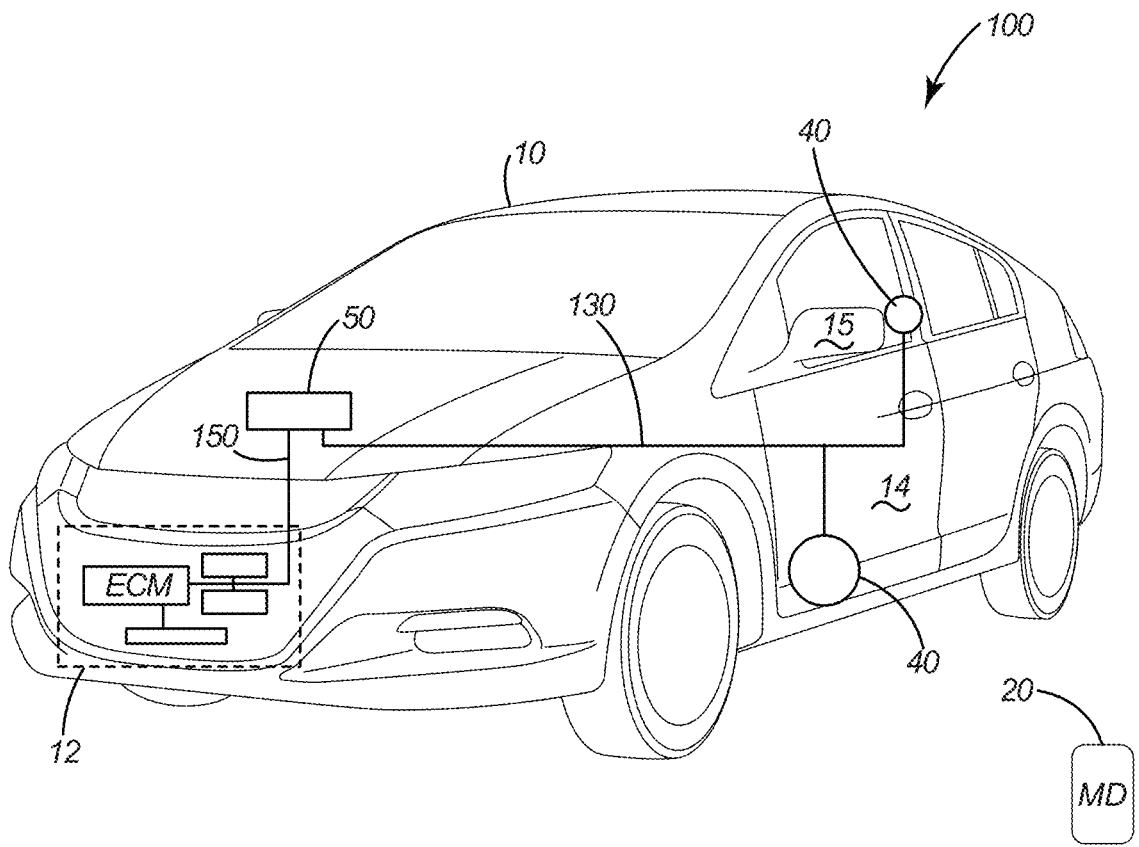
FIG. 2 depicts a system in accordance with one embodiment.

A system in accordance with one embodiment is shown in the illustrated embodiment of FIGS. 1 and 2 and generally designated 100. The system 100 may include one or more system components as outlined herein. A system component may be a user 60 or an electronic system component, which may be the mobile device 20 (which may be a portable device), a remote device 40 (which may be a sensor), or an object device 50, or a component including one or more aspects of these devices. The underlying components of the object device 50, as discussed herein, may be configured to operate in conjunction with any one or more of these devices. In this sense, in one embodiment, there may be several aspects or features common among the mobile device 20, the remote device 40, and the object device 50. The features described in connection with the object device 50 depicted in FIG. 4A may be incorporated into the mobile device 20, or the remote device 40, or both. In one embodiment, the object device 50 may form an equipment component disposed on an object 10, such as a vehicle or a building. The object device 50 may be communicatively coupled to one or more systems of the object 10 to control operation of the object 10, to transmit information to the one or more systems of the object 10, or to receive information from the one or more systems of the object 10, or a combination thereof. For instance, the object 10 may include an object controller 12 configured to control operation of the object 10. The object 10 may include one or more communication networks, wired or wireless, that facilitate communication between the object controller 12 and the object device 50. The communication network for facilitating communications between the object device 50 and the object controller 12 is designated 150 in the illustrated embodiment of FIG. 2 and provided as a CAN bus.

In one embodiment, the system may include a communication controller, such as a telematics control unit (not shown). For instance, the TCU (telematics control unit) may be connected to the object device 50 (via SPI). In another embodiment, the TCU may be combined with the object device 50. In another embodiment, the TCU may be part of the vehicle's object control 12, or connected to the vehicle's object control 12. In another embodiment, the TCU may be absent and data could be tunneled through the portable device (e.g., via BLE). "Tunneled" may be defined as a traditional tunnel—like running TCP/IP over BLE; however, the present disclosure is not so limited. The tunnel may be defined as a configuration that enables relevant data to be communicated to the object device 50 or other system components via commands/responses. The communication controller may be any type of control unit or system capable of facilitating communications. A communication controller may be provided in any component described herein, including the object or the portable device, or both.

In one embodiment, the TCU may include a cellular modem or other long range WAN radio (Lora, Sigfox, etc.).

In one embodiment, as described above, the TCU is not a required part of the system; for instance, all functionality of the TCU and the system it communicates with may be performed locally (not in the cloud).

II. Object Device

Figure 4A:
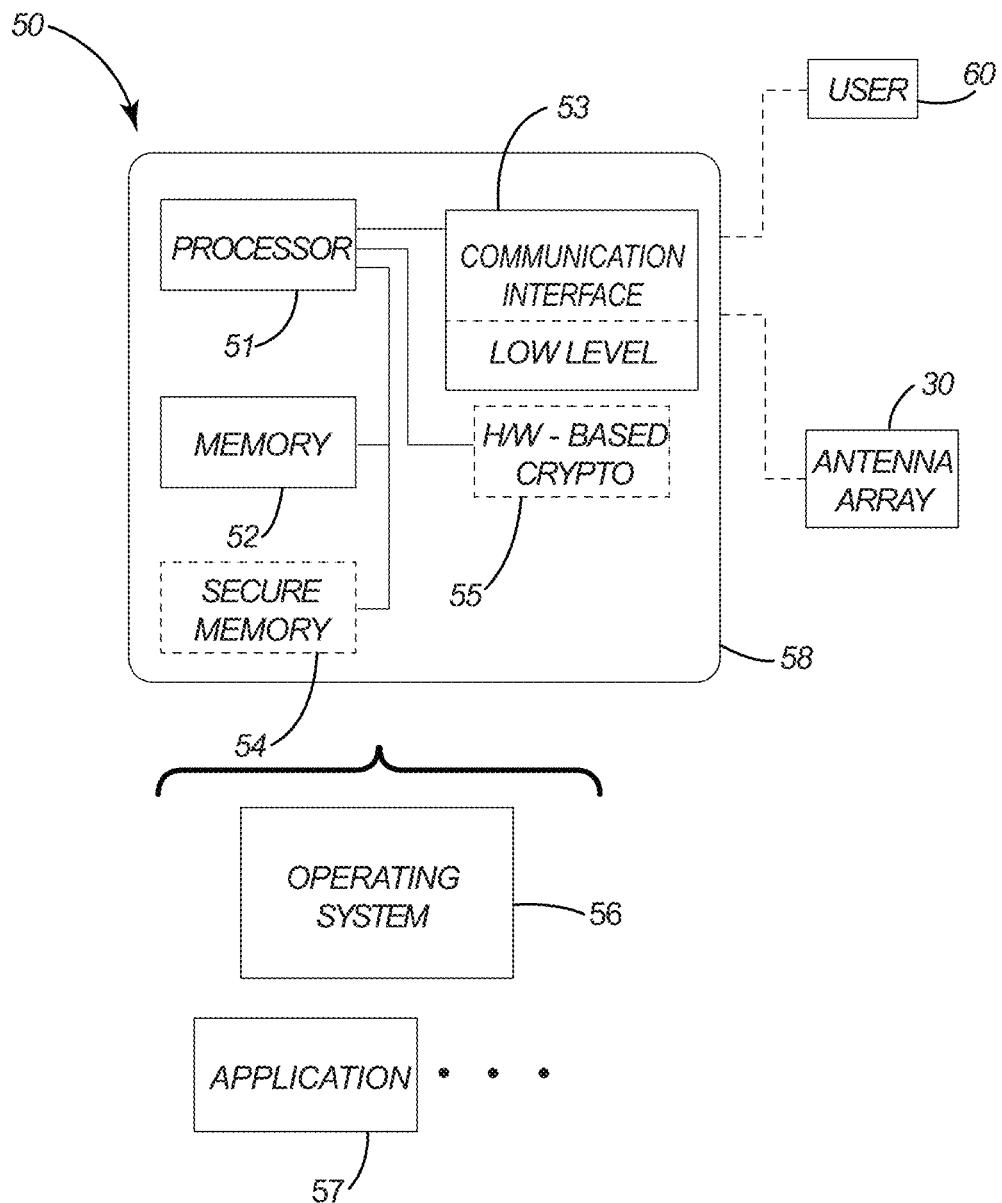
FIG. 4A shows an object device in accordance with one embodiment.

In the illustrated embodiment of FIG. 4A, the object device 50 may include a control system or controller 58 configured to control operation of the object device 50 in accordance with the one or more functions and algorithms discussed herein, or aspects thereof. The system components, such as the mobile device 20, or the remote device 40 (e.g., a sensor), or both, may similarly include a controller 58 configured to control operation or aspects of the respective system component.

The controller 58 includes any and all electrical circuitry and components to carry out the functions and algorithms described herein. Generally speaking, the controller 58 may include one or more microcontrollers, microprocessors, and/or other programmable electronics that are programmed to carry out the functions described herein. The controller 58 may additionally or alternatively include other electronic components that are programmed to carry out the functions described herein, or that support the microcontrollers, microprocessors, and/or other electronics. The other electronic components include, but are not limited to, one or more field programmable gate arrays, systems on a chip, volatile or nonvolatile memory, discrete circuitry, integrated circuits, application specific integrated circuits (ASICs) and/or other hardware, software, or firmware. Such components can be physically configured in any suitable manner, such as by mounting them to one or more circuit boards, or arranging them in other manners, whether combined into a single unit or distributed across multiple units. Such components may be physically distributed in different positions in the object device 50, or they may reside in a common location within the object device 50. When physically distributed, the components may communicate using any suitable serial or parallel communication protocol, such as, but not limited to: CAN, LIN, FireWire, I2C, RS-232, RS-422, RS-485, SPI, Ethernet, Universal Serial Bus (USB), and RF (cellular, WiFi, Bluetooth, Bluetooth Low Energy). As described herein, the terms locator, module, model, and generator designate parts of the controller 58. For instance, a model or locator in one embodiment is described as having one or more core functions and one or more parameters that affect output of the one or more core functions. Aspects of the model, locator, module, or generator, or a combination thereof, may be stored in memory of the controller 58, and may also form part of the controller configuration such that the model, locator, module, or generator, or combination thereof is part of the controller 58 that is configured to operate to receive and translate one or more inputs and to output one or more outputs. A model, locator, module, or generator, or a combination thereof, may be parts of the controller 58 such that the controller 58 is configured to receive an input described in conjunction with the model, locator, module, or generator, or a combination thereof, and provide an output corresponding to an algorithm associated with the model, locator, module, or generator, or a combination thereof.

The controller 58 of the object device 50 in the illustrated embodiment of FIG. 4A may include one or more processors 51 that execute one or more applications 57 (software and/or includes firmware), one or more memory units 52 (e.g., RAM and/or ROM), and one or more communication interfaces 53, amongst other electronic hardware. The object device 50 may or may not have an operating system 56 that controls access to lower-level devices/electronics via a communication interface 53. The object device 50 may or may not have hardware-based cryptography units 55—in their absence, cryptographic functions may be performed in software. The object device 50 may or may not have (or have access to) secure memory units 54 (e.g., a secure element or a hardware security module (HSM)). Optional components and communication paths are shown in phantom lines in the illustrated embodiment.

The controller 58 in the illustrated embodiment of FIG. 4A is not dependent upon the presence of a secure memory unit 54 in any component. In the optional absence of a secure memory unit 54, data that may otherwise be stored in the secure memory unit 54 (e.g., private and/or secret keys) may be encrypted at rest (when possible). Both software-based and hardware-based mitigations may be utilized to substantially prevent access to such data, as well as substantially prevent or detect, or both, overall system component compromise. Examples of such mitigation features include implementing physical obstructions or shields, disabling JTAG and other ports, hardening software interfaces to eliminate attack vectors, using trusted execution environments (e.g., hardware or software, or both), and detecting operating system root access or compromise.

For purposes of disclosure, being secure is generally considered being confidential (encrypted), authenticated, and integrity-verified. It should be understood, however, that the present disclosure is not so limited, and that the term "secure" may be a subset of these aspects or may include additional aspects related to data security.

The communication interface 53 may be any type of communication link, including any of the types of communication links describe herein, including wired or wireless. The communication interface 53 may facilitate external or internal, or both, communications. For instance, the communication interface 53 may be coupled to or incorporate the antenna array 30. The antenna array 30 may include one or more antennas configured to facilitate wireless communications, including BLE communications (e.g., BLE high accuracy distance measurement (HADM), Ultrawide Band (UWB) communications, or another type of wireless communications, or a combination thereof.

As another example, the communication interface 53 may provide a wireless communication link with another system component in the form of the mobile device 20, such as wireless communications according to the WiFi standard. In another example, the communication interface 53 may be configured to communicate with an object controller 12 of a vehicle (e.g., a vehicle component) via a wired link such as a CAN-based wired network that facilitates communication between a plurality of devices. The communication interface 53 in one embodiment may include a display and/or input interface for communicating information to and/or receiving information from the user 60.

In one embodiment, the object device 50 may be configured to communicate with one or more auxiliary devices other than another object device 50 or a user. The auxiliary device may be configured differently from the object device 50—e.g., the auxiliary device may not include a processor 51, and instead, may include at least one direct connection and/or a communication interface for transmission or receipt, or both, of information with the object device 50. For instance, the auxiliary device may be a solenoid that accepts an input from the object device 50, or the auxiliary device may be a sensor (e.g., a proximity sensor) that provides analog and/or digital feedback to the object device 50.

The system 100 in the illustrated embodiment may be configured to determine location information in real-time with respect to the mobile device 20. In the illustrated embodiment of FIG. 1, the user 60 may carry the mobile device 20 (e.g., a smartphone or another type of portable device). The system 100 may facilitate locating the mobile device 20 with respect to the object 10 (e.g., a vehicle) in real-time with sufficient precision to determine whether the user 60 is located at a position at which access to the object 10 or permission for an object 10 command should be granted.

Figure 3:
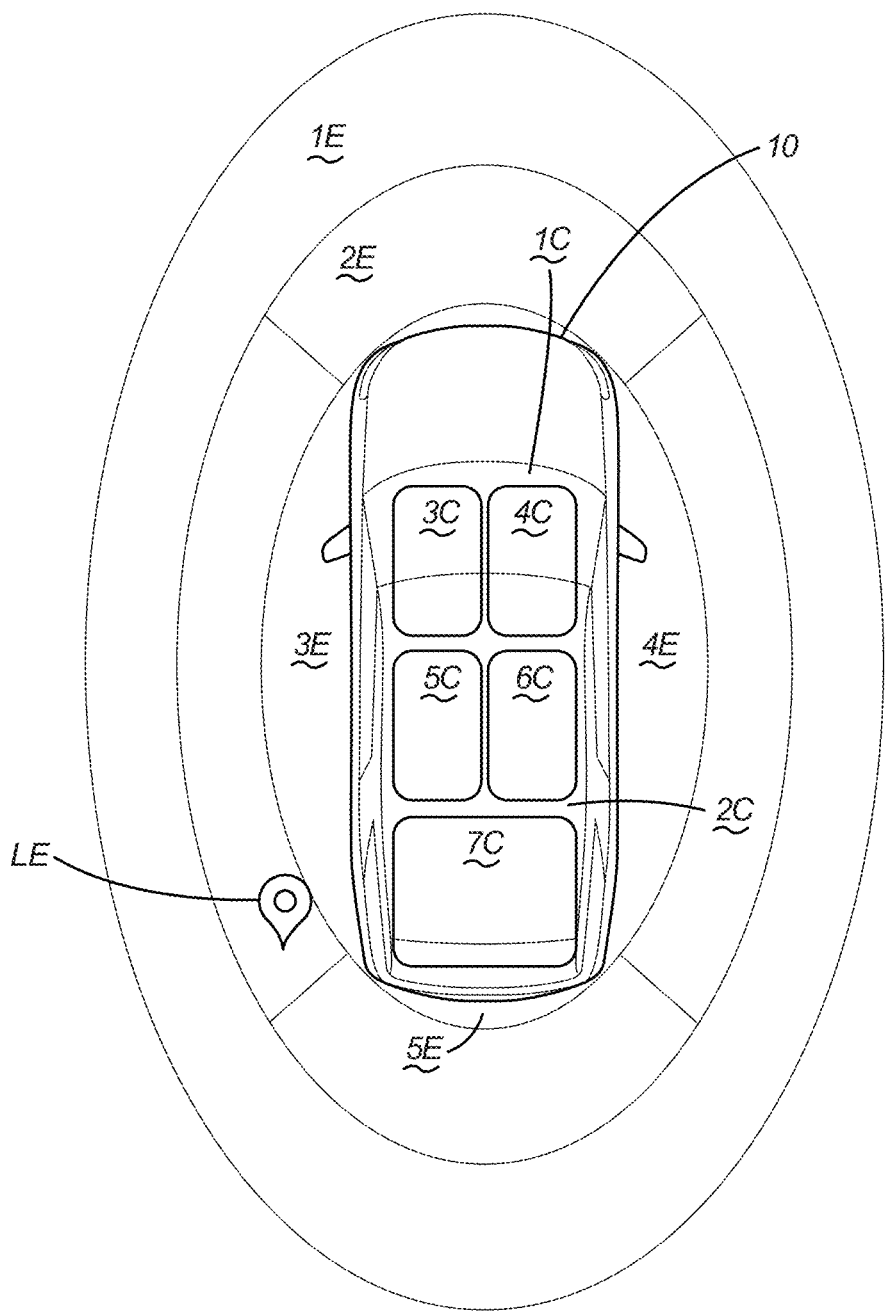
FIG. 3 shows a plurality of zones in accordance with one embodiment

As an example, in the illustrated embodiment of FIG. 3, one or more zones may be defined with respect to the object 10. The one or more zones may be exterior or interior with respect to the object 10. For instance, in the context of the object 10 being a vehicle, several exterior zones 1E, 2E, 3E, 4E, 5E may be defined with respect to areas of the vehicle with zone 1E corresponding to the largest zone of detection (e.g., considered a welcome or approach region), zone 2E corresponding to a 3 m zone, zone 3E corresponding to a drive-side zone, zone 4E corresponding to a passenger side zone, and zone 5E corresponding to a rear vehicle zone (e.g., proximal to a trunk, hatch, or lift gate of the vehicle). Interior zones or zones within a vehicle cabin may also be defined with respect to the vehicle. It is noted that, similar to the exterior zones, interior zones may not be mutually exclusive such that one zone is defined within another zone. For instance, in the illustrated embodiment, interior zone 1C may define a cabin interior zone, with zone 2C being within the interior zone 1C. As another example, zone 3C and zone 4C may correspond respectively to driver-seat and passenger seat zones defined within the interior zone 1C. Likewise, zone 5C and zone 6C may correspond respectively to driver-side rear seat and passenger side rear seat zones, within the interior zone 1C. A rear cabin zone 7C may also be defined with respect to the vehicle and within the interior zone 1C. In the illustrated embodiment of FIG. 3, as described herein, a system may identify or determine a localization estimate or position LE of a mobile device 20 based on wireless communications with the mobile device 20. The position LE is determined based on wireless communications and may be based at least in part on a determination of the mobile device 20 being within the one or more zones defined with respect to the vehicle.

In one embodiment, where the object 10 is a vehicle, the system 100 may facilitate determining whether the mobile device 20 is outside the vehicle but in close proximity, such as within 5 feet, 3 feet, or 2 feet or less, to the driver-side door. This determination may form the basis for identifying whether the system 100 should unlock the vehicle. On the other hand, if the system 100 determines the mobile device 20 is outside the vehicle and not in close proximity to the driver-side door (e.g., outside the range of 2 feet, 3 feet, or 5 feet), the system 100 may determine to lock the driver-side door. As another example, if the system 100 determines the mobile device 20 is in close proximity to the driver-side seat but not in proximity to the passenger seat or the rear seat, the system 100 may determine to enable mobilization of the vehicle. Conversely, if the mobile device 20 is determined to be outside close proximity to the driver-side seat, the system 100 may determine to immobilize or maintain immobilization of the vehicle.

The object 10 may include multiple object devices 50 or variants thereof, such as a remote device 40 coupled to an antenna array 30 in accordance with one or more embodiments described herein.

Micro-location of the mobile device 20 may be determined in a variety of ways, such as using information obtained from a global positioning system, one or more signal characteristics of communications from the mobile device 20, and one or more sensors (e.g., a proximity sensor, a limit switch, or a visual sensor), or a combination thereof. An example of microlocation techniques for which the system 100 can be configured are disclosed in U.S. Nonprovisional patent application Ser. No. 15/488,136 to Raymond Michael Stitt et al., entitled SYSTEM AND METHOD FOR ESTABLISHING REAL-TIME LOCATION, filed Apr. 14, 2017—the disclosure of which is hereby incorporated by reference in its entirety.

In one embodiment, in the illustrated embodiment of FIG. 2, the object device 50 (e.g., a system control module (SCM)) and a plurality of remote devices 40 (coupled to an antenna array 30) may be disposed on or in a fixed position relative to the object 10. Example use cases of the object 10 include the vehicle identified in the prior example, or a building for which access is controlled by the object device 50.

The mobile device 20 may communicate wirelessly with the object device 50 via a communication link 140. The plurality of remote devices 40 may be configured to sniff the communications between the mobile device 20 and the object device 50 to determine one or more signal characteristics of the communications, such as signal strength, angle of arrival, time of flight, or any combination thereof. In an alternative embodiment, the mobile device 20 may establish communications with another device other than the object device 50, but at least one of the object device 50 and the one or more remote devices 40 may be configured to sniff these communications to determine a location of the respective device relative to the object 10.

The communication link 140 in the illustrated embodiment is a Bluetooth Low Energy (BTLE) communication link. However, the present disclosure is not so limited. For example, the communication link 140 may not be BTLE; it may be wired or wireless and established according to any protocol, including UWB instead of BTLE. As another example, the communication link 140 may include more than one type of communication link; e.g., the communication link 140 may be established according to both BTLE and UWB.

The determined signal characteristics may be communicated or analyzed and then communicated to the object device 50 via a communication link 140 separate from the communication link between the mobile device 20 and the object device 50. Additionally, or alternatively, the mobile device 20 may establish a direct communication link with one or more of the remote devices 40, and the one or more signal characteristics may be determined based on this direct communication link.

As described herein, one or more signal characteristics, such as signal strength, time of flight, and angle of arrival, may be analyzed to determine location information about the mobile device 20 relative to the object 10, an aspect of the object 10, or the object device 50, or a combination thereof. For instance, time difference of arrival or the angle of arrival, or both, among the remote devices 40 and the object device 50 may be processed to determine a relative position of the mobile device 20. The positions of the one or more antenna arrays 30 relative to the object device 50 may be known so that the relative position of the mobile device 20 can be translated to an absolute position with respect to the antenna arrays 30 and the object device 50.

Additional or alternative examples of signal characteristics may be obtained to facilitate determining position according to one or more algorithms, including a distance function, trilateration function, a triangulation function, a multilateration function, a fingerprinting function (e.g., a fingerprinting heuristics), a security and consistency checking function, a differential function, a time of flight function, a time of arrival function, a time difference of arrival function, an angle of departure function, a geometric function, a machine learning function, etc., or any combination thereof. As described herein, output from multiple algorithms may be combined or correlated in a variety of ways to determine a position LE. Additionally, or alternatively, a position LE determined from one or more algorithms may be enhanced by one or more other algorithms (e.g., by increasing accuracy, precision, or confidence, or a combination thereof).

III. Remote Device

Figure 4B:
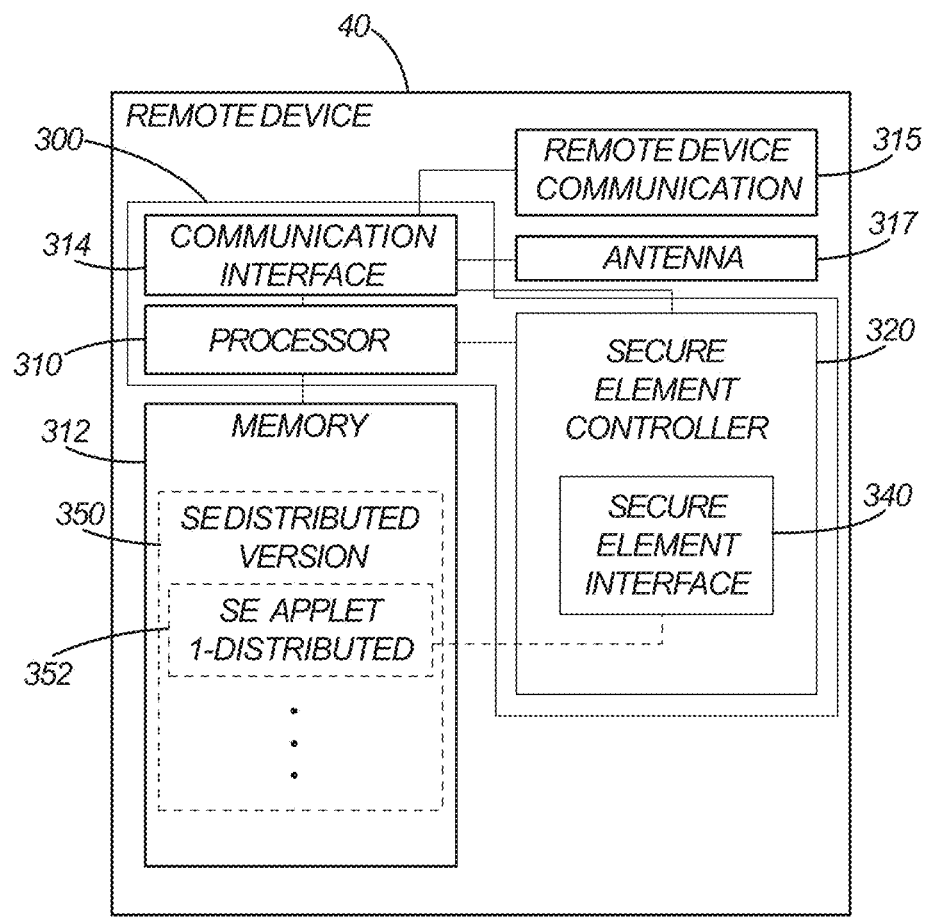
FIG. 4B shows a remote device in accordance with one embodiment.

The remote device 40 in accordance with one embodiment is shown in FIG. 4B. The remote device 40 may include a control system 300, which may be similar to a control system of the object device 50 in several respects. For instance, the control system 300 of the remote device 40 may include one or more processors 310 that execute one or more applications (software and/or firmware), one or more communication interfaces 314, and a secure element controller 320.

The secure element controller 320 of the remote device 40 may facilitate communication with respect to a secure element stored in memory 52 of the object device 50. In one embodiment, the secure element controller 320 may be an NFC controller operably coupled to the communication interface 314. The remote device 40, as described herein, may include memory 312 (e.g., RAM and/or ROM), which may be internal or external to the control system 300— although it is shown external to the control system 300 in the illustrated embodiment.

In the illustrated embodiment, the communication interface 314 may be coupled to one or more antennas 317 (e.g., an NFC antenna). The remote device 40, via the communication interface 314 and the antenna 317, may establish a communication link 160 with the mobile device 20. The communication link 160 may be established according to the NFC standard, or according to any type of communications described herein, including BTLE and UWB. The communication link 160, as described herein, may be passive relative to the remote device 40 such that the remote device 40 passively receives communications between the mobile device 20 and the object device 50 that are communicated via the communication link 140. For instance, in this passive configuration, the mobile device 20 may utilize the communication link 160 to monitor or receive transmissions that occur via the communication link 140 without interfering with or actively participating in the communication link 140.

The remote device 40 in the illustrated embodiment may include a remote device communicator 315 capable of facilitating establishment of the communication link 130 with the object device 50 in conjunction with the communication interface 314 of the remote device 40. The secure element controller 320 of the remote device 40 may directly interact with the communication interface 314.

In the illustrated embodiment, the secure element controller 320 may include a secure element interface 340. The secure element interface 340 may be in the form of a remote or distributed interface with respect to a secure element of the object device. An example of such a configuration is described in U.S. 63/168,384, entitled SYSTEM AND METHOD OF DISTRIBUTED COMMUNICATIONS, filed Mar. 31, 2021, to Smith—the disclosure of which is hereby incorporated by reference in its entirety.

In one embodiment, the secure element interface 340 of the secure element controller 320 may be operable as a pass-through or relay for communications established between the mobile device 20 and the remote device 40. Information communicated to and from the secure element 340 of the secure element controller 320 and a secure element controller of the object device 50 may be considered secure element information. In other words, communications from the mobile device 20 directed to the secure element controller 320 may be transmitted to a secure element controller of the object device 50 via the communication link 130 or processing by the secure element of the object device 50. Communications from the secure element of the object device 50 may be transmitted to the secure element controller 320 of the remote device 40 and passed on to the mobile device 20 via the communication link 140. The communications in this example may be in accordance with the NFC standard; but it is to be understood the present disclosure is not so limited. The communications may be established in accordance with an additional or alternative standard.

IV. Locator

The system 100 in the illustrated embodiment of FIGS. 1-3 may be configured to determine location information about the mobile device 20 relative to the object 10. The location information may be indicative of an exterior location of the mobile device 20 relative to the object 10, or the location information may be indicative of an interior location of the mobile device 20 within the object 10, or a combination thereof. In one embodiment, a locator may be configured to determine this location information. The locator, as described herein, may be configured as a first locator that receives input and generates first output that may be processed in conjunction with a second output of a second locator different from the first locator. In this way, outputs from multiple locators may be processed or layered to yield location information. The output from one locator may be enhanced by the output of another locator. For instance, accuracy, precision, or confidence, or any combination thereof, of output from one locator may be enhanced with the output of another locator.

The location information output from a locator in accordance with one embodiment may include positional information or a zone classification, or both. Positional information may correspond to coordinates (absolute or relative) or a distance relative to a reference point. The reference point may be defined as the location of the device in which the locator is provided, or another location of the object. One or more locators may use the same or different reference points. The zone classification may correspond to a region of space defined with respect to the vehicle, such as the zones described herein. First and second zones of the available zone classifications may be defined relative to each other in a variety of ways. For instance, the first and second zones may or may not intersect. As another example, the second zone may be a proper subset of the first zone (e.g., the second zone may be smaller and contained within the first zone). Any locator described herein may be configured to provide location information in the form of positional information or a zone classification, or both.

As described herein, a plurality of locators may be provided in the system 100, and one or more locators of the plurality may be provided in one device with one or more other locators of the plurality being provided in another device. One or more outputs from any of the plurality of locators may be processed together to yield first location information, and such first location information may be processed with one or more outputs from any of the plurality of locators to yield second location information.

Figure 5:
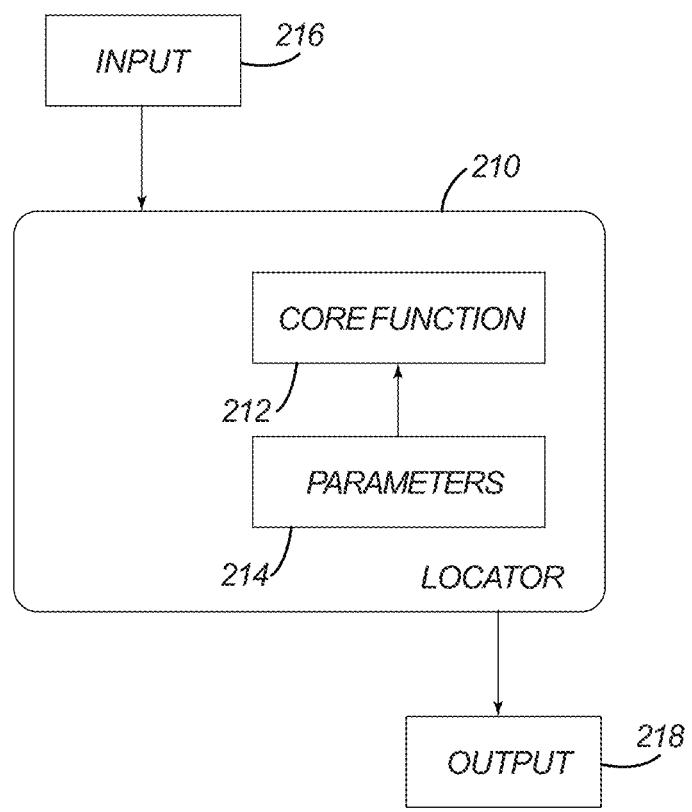
FIG. 5 shows a locator in accordance with one embodiment.

A locator in accordance with one embodiment is depicted in FIG. 5 and generally designated 210. The locator 210 may be configured to receive one or more inputs 216, such as one or more signal characteristics of wireless communications transmitted by the mobile device 20 and received by one or more remote devices 40 and/or the object device 50. The inputs may be translated to one or more outputs 218 corresponding to the location information.

It should be understood that the inputs 216 are not limited to signal characteristics of wireless communications. The inputs 216 may include one or more measurements of characteristics or parameters other than wireless communications. Additionally, or alternatively, the inputs 216 may be indicative of a state of the object 10 or another device in the system 100. For instance, in the context of a vehicle, one or more of the inputs 216 may indicate that one or more of the vehicle doors are open or closed, or whether a window is open or closed.

The locator 210 in the illustrated embodiment may be incorporated into at least one of the object device 50 and a remote device 40. For instance, the controller 58 of the object device 50 may incorporate the locator 210, and be communicatively coupled to one or more of the remote devices 40 via the communication interface 53.

The locator 210 may include a core function or locator algorithm 212 that is configured to receive the one or more inputs 216 and to generate the one or more outputs 218 indicative of a location of the mobile device 20 relative to the object 10. As discussed herein, the one or more inputs 216 may vary from application to application. Examples of inputs 216 include one or more signal characteristics of the communications, such as signal strength (RSSI), angle of arrival (AOA), time of flight (TOF), time of arrival, and a phase characteristic. The one or more signal characteristics may be analyzed to determine location information about the mobile device 20 relative to the object 10, an aspect of the object 10, or the object device 50, or a combination thereof.

For instance, a phase rotation of a tone transmission, and optional re-transmission, or a phase characteristic indicative of a phase rotation may form the basis for determining a distance between an object device 50 or a sensor 40 and the mobile device 20. The tone transmission may form part of a tone exchange in which a plurality of transmissions are conducted according to multiple frequencies. A phase rotation with respect to such transmissions may form the basis for a distance determination with respect to the object device 50 and the remote device 20. The tone exchange may be described as a channel sounding approach (e.g., BLE channel sounding (CS)) for determining a range or distance between devices (e.g., between the object device 50 and the mobile device 20).

With respect to an electromagnetic wave traveling at the speed of light in a particular medium (e.g., air), an amount of phase rotation may be translatable to a distance or a time. In one embodiment, a roundtrip time (RTT) may be determined with respect to transmissions to and from a device, such as the mobile device 20, via measurement of a phase characteristic or a time characteristic. In other words, two-way transmissions to and from the mobile device 20 may be analyzed to determine a roundtrip time, which can be translated as a time of flight.

Because the wavelength for high frequency transmissions can be short relative to the target distance being measured, the transmissions wrap or complete full phase rotations such that total phase rotation embodied as the total distance cannot be measured directly from a phase in the input stage of the RF circuitry 204 (e.g., by the mixer stage 260). For instance, for a carrier frequency at 2.4 GHz, the phase rotation wraps around $2\pi$ with d in the range of 12 cm. A phase measurement may indicate a phase within the range $0\text{-}2\pi$, but the phase measurement does not directly indicate the number of phase rotation wraps.

To measure longer distances without ambiguity, two different frequencies (f0, f1) can be used at two different instants i in time (i0, i1) to compute two different phases rotations. The two different phase rotations can be used to measure the distance. A phase-based distance determination is described in conjunction with two different frequencies—however, it is to be understood that phase measurements for a plurality of frequencies (including more than two frequencies) may be used to enhance accuracy of the distance determination. The use of multiple frequencies in the phase analysis may be considered a type of channel sounding approach to determine distance between devices. The locator 210 in one embodiment may translate the signal characteristic obtained from a remote device 40 or the object device 50 to a distance metric or other parameter in a variety of ways, including, for instance, a translation table for each fixed position device or type of fixed position devices, fingerprinting or other heuristic (e.g., a machine learned translator). Additional examples of such a translation are described in U.S. Pub. 2020/0137817, entitled SYSTEM AND METHOD OF DETERMINING REAL-TIME LOCATION, filed Oct. 23, 2019, to Smith—the disclosure of which is hereby incorporated by reference in its entirety.

The locator algorithm 212 of the locator 210 may be tunable according to a plurality of parameters 214 of the locator 210. Based on the one or more inputs and the values of the plurality of parameters 214, the locator algorithm 212 may provide an output indicative of a location of the mobile device 20 relative to the object 10. The locator algorithm 212 may vary from application to application.

In one example, the locator algorithm 212 may be a neural network (e.g., a convolutional neural network with one or more layers), and the one or more parameters may include weights of nodes within the neural network. The weights may be adjusted during training of the locator 210 with samples obtained from a mobile device 20 and the object 10 and truth information obtained with respect to the samples.

In a vehicle, there may be many antennas in accordance with one embodiment of the system 100, where each of the antennas may be in a different location with a different orientation. All or a subset of the antennas and associated devices, such as the object device 50 or the remote device 40, may facilitate obtaining RSSI, angle of arrival, time of flight, or other, or any combination thereof, measurements simultaneously.

Because a variety of factors can affect one or more signal characteristics of communications between a receiver and a transmitter, to facilitate tuning the locator 210 and the locator algorithm 212, samples may be obtained for the one or more signal characteristics under a variety of conditions.

Example variations in conditions can include purposefully rotating the mobile device 20 in all directions, as well as obtaining test samples at different heights to ground, to force testing or obtaining samples to cover a large percentage of all possible angles/orientations.

V. Distributed Locator System

As described herein, the system 100 may include a plurality of locators 210 provided in one or more devices of the system 100, including, for instance, one or more of at least one of the remote devices 40 and the object device 50. Outputs from one or more locators 210 may be processed by a combiner or aggregator to yield an output indicative of location information pertaining to the mobile device 20 relative to the object 10.

For purposes of discussion, the locators 210 may be shown and described separate from the underlying hardware on which each locator 210 is provided. For instance, in the illustrated embodiment of FIG. 6, a locator system 400 is shown and depicted with multiple locators designated 410-1, 410-2, 410-3 for discussion purposes. The locators of the locator system 400, e.g., the locators 410-1, 410-2, 410-3, may be similar to the locator 210 described herein, and may include one or more aspects of the locator 210. Likewise, the locator 210 described herein may include one or more aspects of the locators described in conjunction with the locator system 400.

Figure 6:
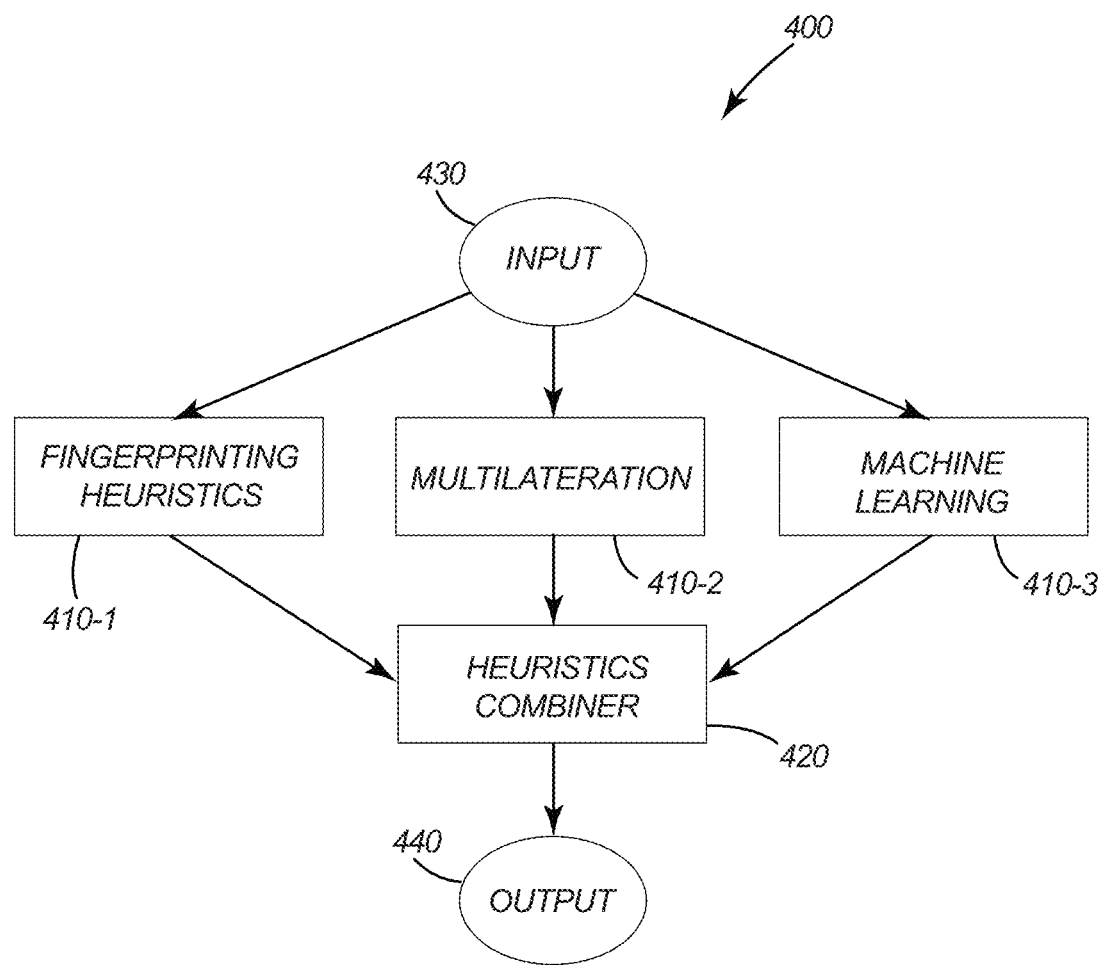
FIG. 6 shows a locator system in accordance with one embodiment.

In the illustrated embodiment of FIG. 6, the locator system 400 is configured to receive input 430 similar to the input 216 described in conjunction with the locator 210. For instance, the input 430 may correspond to BLE information (e.g., signal strength [RSSI]), UWB information (e.g., ranging data, power measurements, line-of-sight metrics, and noise power, or a combination thereof), mobile device data (e.g., GPS and accelerometer data, or both), or automobile data (e.g., GPS data), or a combination thereof.

Although the input 430 is shown being provided to each of the plurality of locators 410-1, 410-2, 410-3, and the input 430 is described as including multiple types of data, it is to be understood that not all types of data in the input 430 may be provided to each of the plurality of locators 410-1, 410-2, 410-3, and that not all of the locators 410-1, 410-2, 410-3 may receive the same data as part of the input 430. For instance, in the case of the input 430 including first data and second data, the first data may be provided to one locator and both the first and second data may be provided to another locator.

The locator system 400 in the illustrated embodiment includes a locator 410-1 configured different from the locators 410-2, 410-3. For instance, the locator 410-1 may be a first type of locator configured to generate an output based on fingerprinting heuristics of the input 430 received by the locator 410-1.

In the illustrated embodiment, the locator 410-2 is a second type of locator different from the first type of locator. However, it is to be understood that the locator 410-2 may be the same type of locator as the first locator. The second type of locator in the illustrated embodiment is configured to generate an output based on multilateration of the input 430 received by the locator 410-2. As an example, the locator 410-1 may be configured to determine location based on UWB communications, and the locator 410-2 may be configured to determine location based on a channel sounding approach, such as a channel sounding approach for determining RTT based on BLE communications.

The locator 410-3 in the illustrated embodiment is a third type of locator different from the first and second types of locators. However, it is to be understood that the locator 410-3 may be the same type of locator as the first locator or the second locator, or both.

The outputs from the locators 410-1, 410-2, 410-3 may be provided to a combiner 420 (e.g., a heuristic combiner) operable to generate an output 440 indicative of a location of the mobile device 20 relative to the object 10. The combiner 420 may be a type of locator operable to receive a plurality of inputs and to generate an output indicative of a location of the mobile device 20 relative to the object 10. However, in contrast to one or more of the locators 410-1, 410-2, 410-3, the combiner 420 may receive, as input, outputs from a plurality of locators 410-1, 410-2, 410-3. The combiner 420 may be disposed on any component of the system 100, and that component may or may not include one or more of the locators 410-1, 410-2, 410-3.

The output 440 from the combiner 420 may vary from application to application. Example outputs include coordinates of the mobile device 20 (e.g., X, Y, Z and/or rho, theta, phi), and a zone (e.g., an unlock zone, inside the vehicle, front passenger seat).

In one embodiment, the output 440 from the combiner 420 may be provided to another combiner operable to receive the output 440 as input and output from another combiner or a locator, or a combination thereof.

As described herein, the locators 410-1, 410-2, 410-3 and the combiner 420, or a combination thereof, may be disposed on one or more separate components of the system 100. For instance, the locator 410-1 may be disposed in any component of the system 100, such as in the object device 50 or a remote device 40. This component on which the locator 410-1 is disposed may be different from a component on which one or more other locators are disposed.

Figure 7:
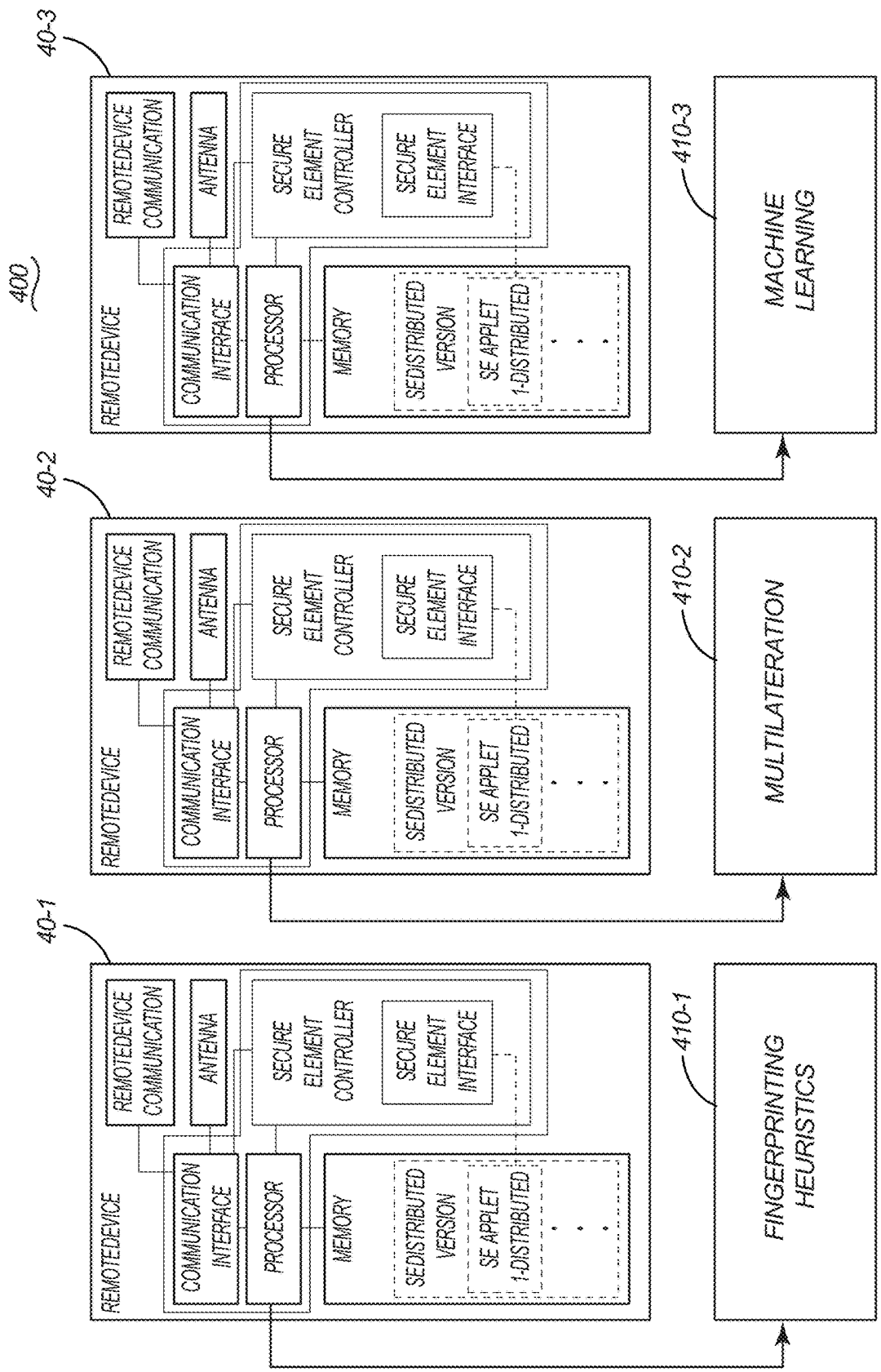
FIG. 7 shows a locator system in accordance with one embodiment.

In the illustrated embodiment of FIG. 7, a locator system 400 may include the locators 410-1, 410-2, 410-3 each being disposed on a separate remote device 40-1, 40-2, 40-3. The outputs from one or more of the locators 410-1, 410-2, 410-3 may be communicated to a combiner 420 of a component via the communication link 130 (which may be an auxiliary link), or another communication link described herein. It is to be understood that, although each remote device 40-1, 40-2, 40-3 is depicted having a single locator 410-1, 410-2, 410-3, more than one locator 410-1, 410-2, 410-3 may be provided in a remote device 40-1, 40-2, 40-3. Additionally, although the locators 410-1, 410-2, 410-3 are disposed in remote devices 40-1, 40-2, 40-3, it is to be understood that one or more of the locators 410-1, 410-2, 410-3 may be disposed in another component described herein, such as the object device 50 or the mobile device 20, or both.

In one embodiment, by distributing the locators 410-1, 410-2, 410-3 among more than one component of the system 100, computation power of the system 100 may be distributed with respect to the locators 410-1, 410-2, 410-3.

Figure 8:
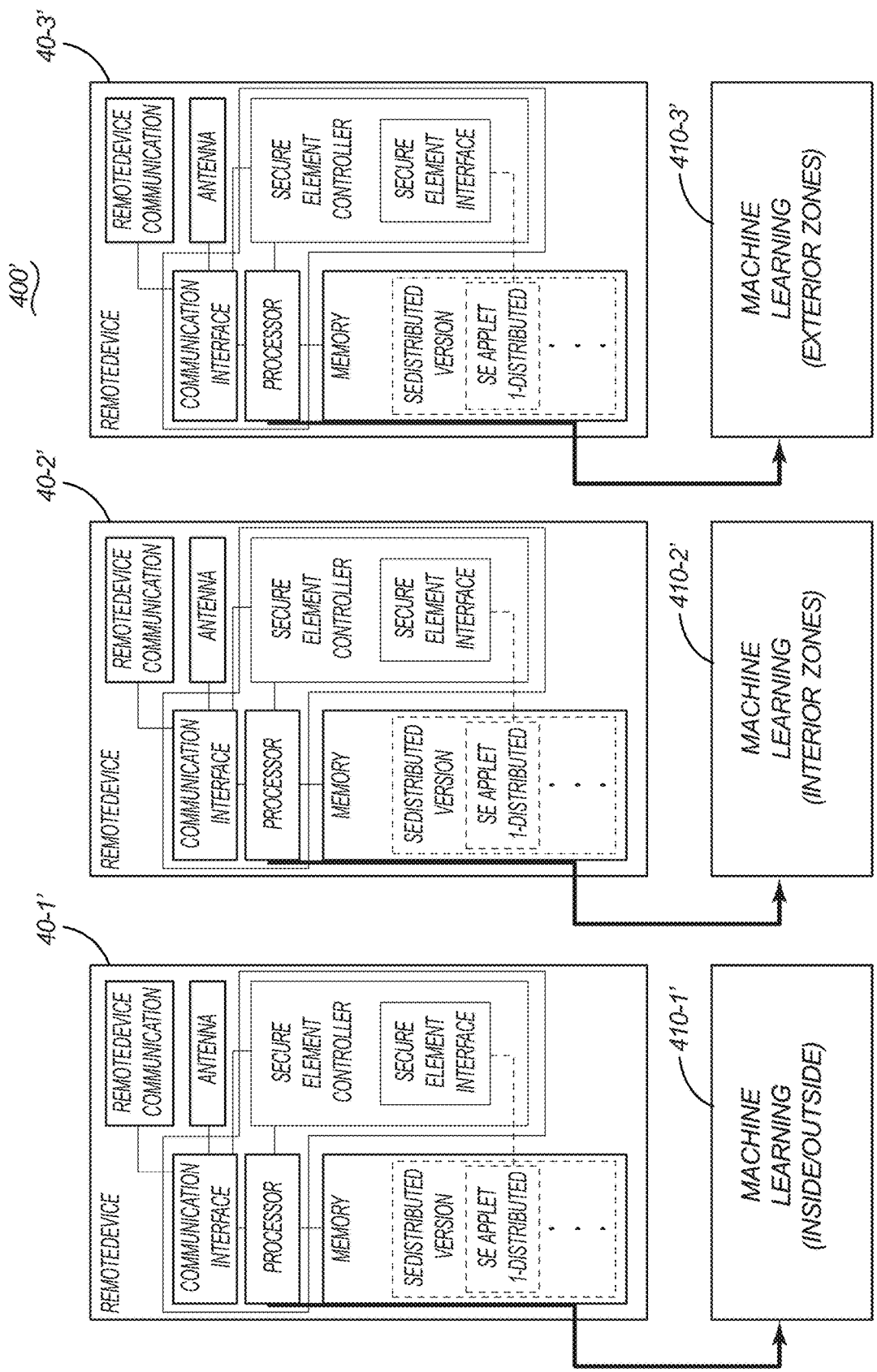
FIG. 8 shows an alternative locator system in accordance with one embodiment.

In the illustrated embodiment of FIG. 8, a locator system 400' is shown in conjunction with a plurality of remote devices 40-1', 40-2', 40-3' each having a selective locator 410-1', 410-2', 410-3'. The locator system 400' may be similar to the locator system 400 except the locators 410-1', 410-2', 410-3' are configured differently. For instance, the locator 410-1' is configured to determine location information based on a machine learning algorithm, and particularly to generate location information indicative of a zone of the mobile device 20 being inside or outside of the object 10. The locator 410-2' is configured to determine location information based on a machine learning algorithm, with a focus on generating location information indicative of a location of the mobile device 20 in interior zones of the object 10 (e.g., zones 1C, 2C, 3C, 4C, 5C, 6C, 7C). The locator 410-3' may also be configured to determine location information based on a machine learning algorithm, but with a focus on generating location information indicative of a location of the mobile device 20 in exterior zones of the object 10 (e.g., zones 1E, 2E, 3E, 4E, 5E).

In one embodiment, a locator system may be configured similar to the locator system 400', with the exception of one or more of the locators 410-1', 410-2', 410-3' being configured to generate positional information in addition to or alternative to zone classification information. It is further noted that any device described herein may include more than one type of locator, such as first and second locators 410-1', 410-2' being disposed in the same device. In this and other examples described herein, the first locator 410-1' being a first type operable to provide position information (e.g., position estimation) and the second locator 410-2' being a second type operable to provide zone classification information.

Figure 9:
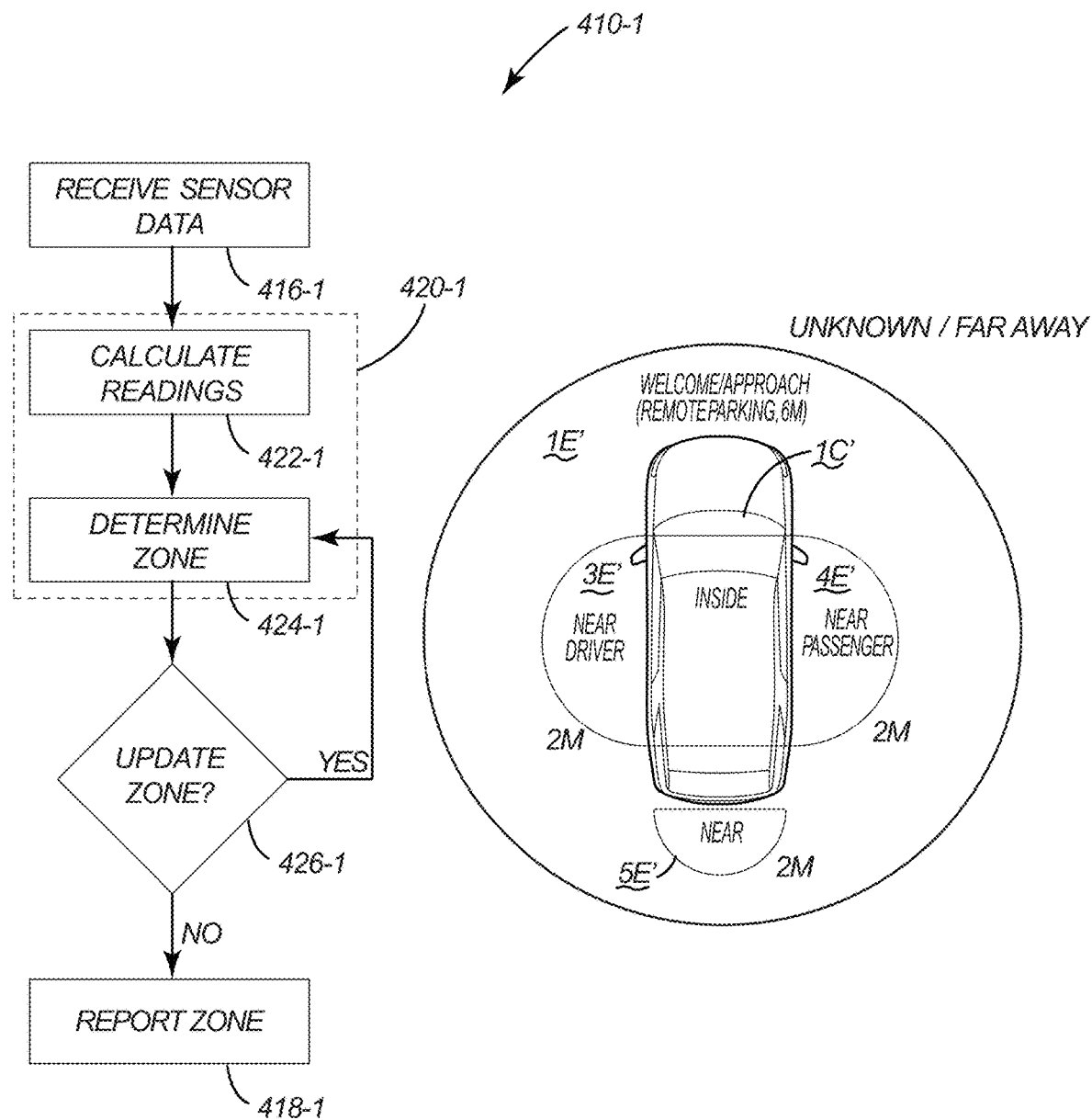
FIG. 9 shows a locator in accordance with one embodiment.

Turning to the illustrated embodiment of FIG. 9, the locator 410-1 is shown in further detail as a locator configured for determining location information based on fingerprinting heuristics. The locator 410-1 may be operable to perform the method steps depicted in the illustrated embodiment. For instance, the core function of the locator 410-1 may be operable to receive sensor data and determine location information based on the sensor data. Steps 416-1, 420-1. Determination of location information may include analysis of the sensor data and determination of a zone based on the analyzed sensor data. Steps 422-1, 424-1. In the illustrated embodiment, the locator 410-1 may be configured to report or output zone information selectively in response to a determined zone being different from a previously determined zone. For instance, if the zone determined by the locator 410-1 is different from a previously determined zone, the zone may be provided as output from the locator 410-1. Steps 426-1, 418-1. Zone information determined by the locator 410-1 may correspond to one or more zones identified with respect to the object, such as the zones 1E', 3E', 4E', 5E', 1C' depicted in the illustrated embodiment.

The fingerprinting heuristics methodology of the locator 410-1 may be implemented in conjunction with sensor data with respect to communications according to a variety of protocols, including BLE, UWB, or both. The zone determination at step 424-1 may be based on an established set of rules that are set based on comparative measurements of the remote devices 40-1, 40-2, 40-3 and previous system states. The zone determination may also account for heuristics effects to enhance results as the mobile device 20 traverses from one zone to another.

In one embodiment, the fingerprinting heuristics methodology may be customized to a specific object type, such as a vehicle model, or a type of mobile device 20, or both. The fingerprinting heuristics methodology may be adapted, as described herein, by adjusting one or more parameters 214 in order to adapt the core function or locator algorithm 212 of the fingerprinting heuristics methodology for varying vehicle models or types of mobile devices 20, or both.

Figure 10:
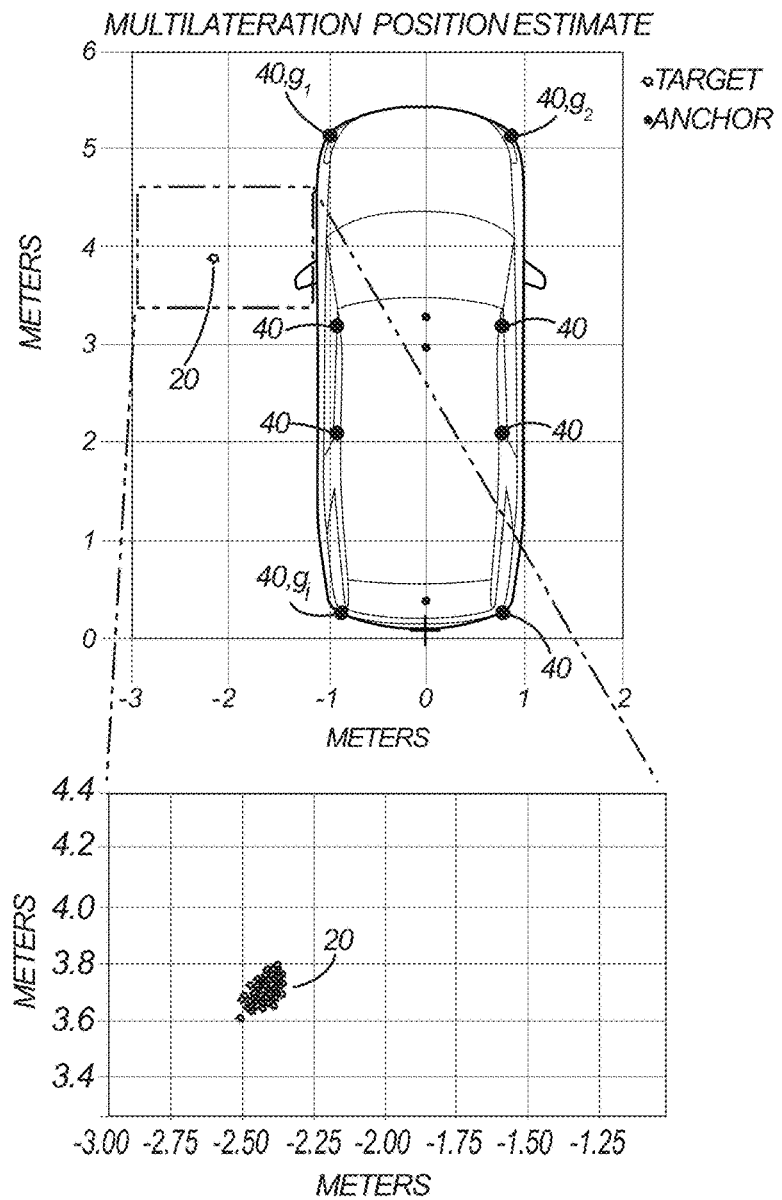
FIG. 10 shows a locator in accordance with one embodiment.
Figure 10:
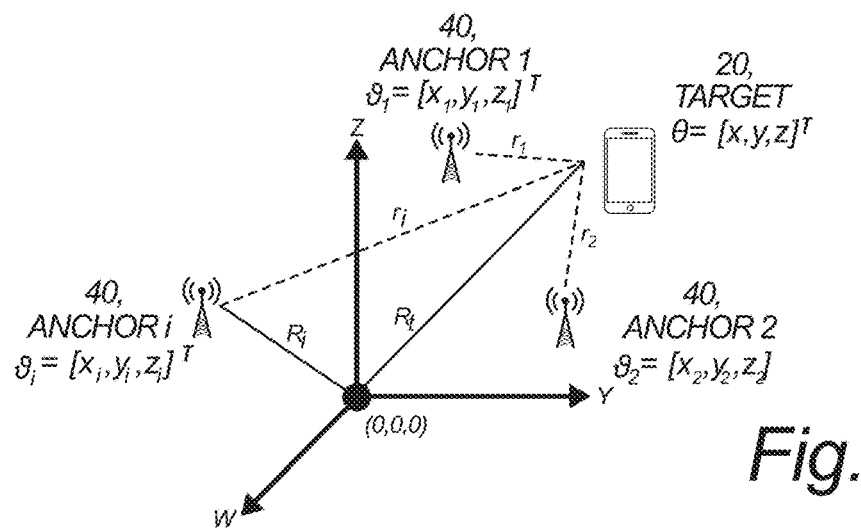

In the illustrated embodiment of FIG. 10, the locator 410-2 is shown in further detail as a locator configured for determining location information based on multilateration. In one embodiment, the core function of the locator 410-2 may be configured to implement a multilateration-based determination of location according to a Range-Bancroft methodology. This type of methodology may provide a closed form solution that is computationally inexpensive and deterministic. In some implementations, a multilateration-based determination of location may be susceptible to noise and multipath effects, and so filtering and preprocessing may be implemented with respect to the input 430 provided to the locator 410-2 in order to reduce multipath effects and adverse effects due to noise.

The locator 410-2 in the illustrated embodiments may be configured to receive input 430 in the form of signal strength information (e.g., RSSI) or another type of sensor data that is causally affected by distance between the mobile device 20 and a remote device 40. The locator 410-2 may receive input 430, as described herein, from multiple components of the system 100, including one or more remote devices 40 and the object device, or a combination thereof. Derivation of the multilateration function and output of the locator 410-2 may be provided according to the following:

Expand the squared range equation:

$$r_i^2 = \|\vartheta i\|^2 - 2\vartheta_i^T \theta + \|\theta\|^2 \tag{1}$$

and rewrite as:

$$\begin{bmatrix} 2\vartheta_1^T \\ \vdots \\ 2\vartheta_1^T \end{bmatrix} \theta = \begin{bmatrix} 1 \\ \vdots \\ 1 \end{bmatrix} \|\theta\|^2 + \begin{bmatrix} \|\vartheta_1\|^2 - r_1^2 \\ \vdots \\ \|\vartheta_1\|^2 - r_1^2 \end{bmatrix} \tag{2}$$

$$A\theta = 1\|\theta\|^2 + b \tag{3}$$

$$\theta = A^\dagger 1 \|\theta\|^2 + A^\dagger b \tag{4}$$

where $A^\dagger$ denotes the Moore-Penrose pseudo-inverse of A. Substituting $p = A^\dagger 1$ and $q = A^\dagger b$:

$$p\theta = \|\theta\|^2 + q \tag{5}$$

The Range-Bancroft method will solve for a least-squares fit (i.e., solve for $\|\theta\|^2$) and then substitute the solution back into (5) to solve for target position. As will be seen in the derivation below, the solution is determined by solving a quadratic equation which can have up to two roots; the best of which will need to be determined. Taking the squared norm of (10):

$$\|\theta\|^2 = \|p\|^2 \|\theta\|^4 + 2p^T q \|\theta\|^2 + \|q\|^2 \tag{6}$$

and then rearrange to:

$$\|p\|^2\|\theta\|^4+(2p^Tq-1)\|\theta\|^2+\|q\|^2=0 \quad (7)$$

Set $t=\|\theta\|^2$:

$$\|p\|^2 t^2+(2p^Tq-1)t+\|q\|^2=0 \quad (8)$$

Solving for t can result in zero, one or two real roots. For UWB localization according to one embodiment, the solution may include two real roots. The two roots can be substituted into (5) to estimate the target position $\hat{\theta}$ and the "correct" target estimate will be that with the smallest residual as computed according to:

$$\Sigma_{i=1}^1 (\hat{m}_i-\|\vartheta_1-\hat{\theta}\|)^2 \quad (9)$$

Figure 11:
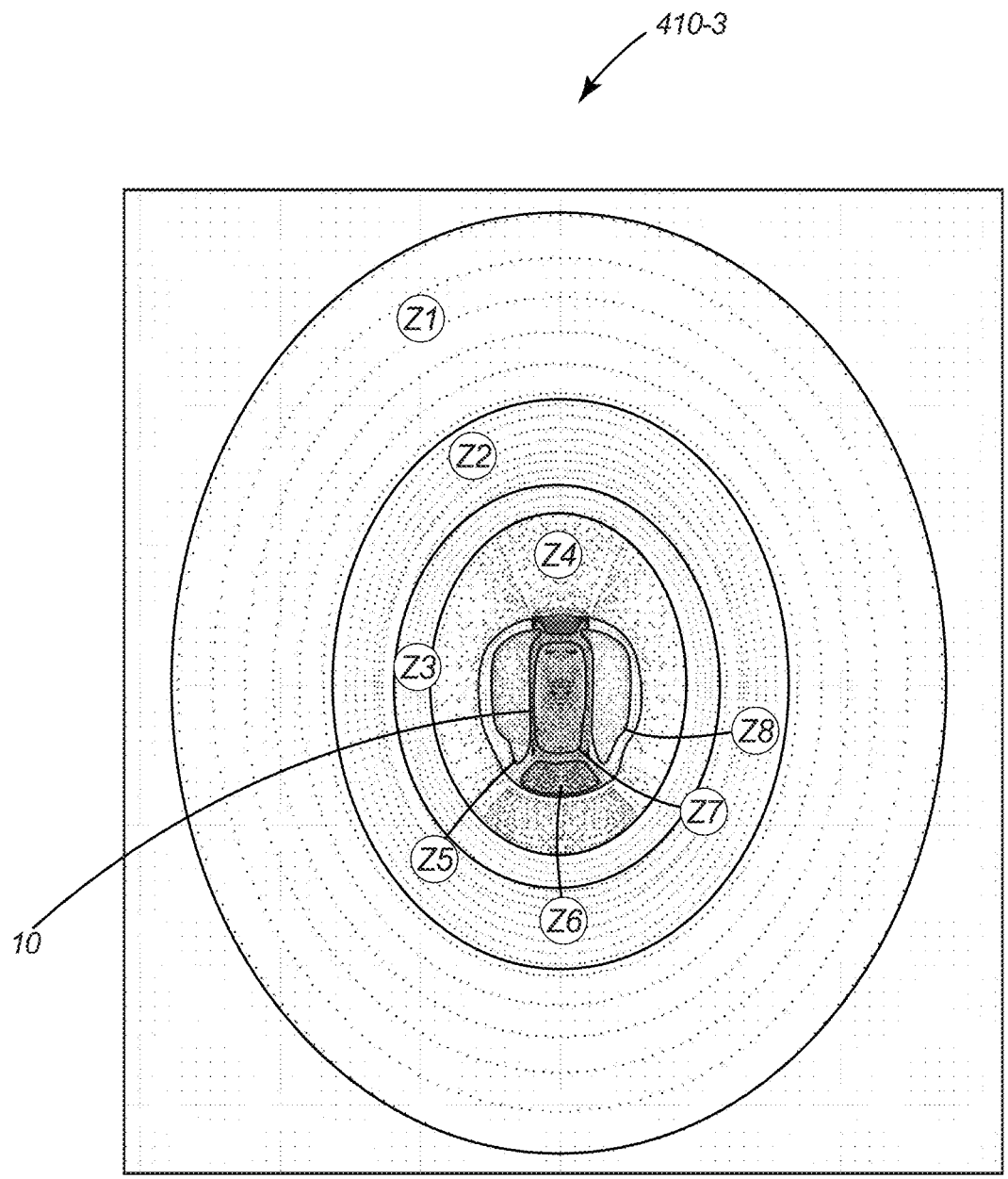
FIG. 11 shows a locator in accordance with one embodiment.

In the illustrated embodiment of FIG. 11, the locator 410-3 is shown in further detail as a locator configured for determining location information based on machine learning. In one embodiment, the core function of the locator 410-3 may be configured to implement a machine learning-based determination of location. This type of methodology may provide a model that can use classification (determination of zones) or use regression models (localized position estimate), or both.

In one embodiment, the machine learning algorithm of the locator 410-3 may implement a boosting model to determine probability that a mobile device 20 in the form of an initiator is in each zone defined with respect to the object 10. Training and test data may be obtained as truth data for training the model. The training and test data may include the zone or location information of the mobile device 20 and the input 430. In other words, the training and test data may include both the input and output for the locator 410-3. The training data may be provided for training the model, and the test data may be provided for validation of the model with respect to data not seen during the training stage of the model. In one embodiment, the model provided in the locator 410-3 may be a machine trained model that is trained in this manner prior to use in the field. Additionally, or alternatively, the model may be adjusted in the field (e.g., re-trained or further trained in the field). For instance, continual learning may be conducted in the field to adjust the model in use.

In one embodiment, a machine learning based locator 410-3 may be configured to accurately classify zones with greater than 90% accuracy. Zones Z1, Z2, Z3, Z4, Z5, Z6, Z7, and Z8 are identified in FIG. 11, for which the locator 410-3 may be operable to identify.

As described herein, the output from the locator 410-3 may be analyzed in conjunction with output from another locator by a combiner 420 to facilitate avoidance of leakage or misclassification near zone boundaries.

Although the locator 410-3 is described in connection with a boosting model for machine learning, it is to be understood that different types of models may be implemented depending on the configuration. For instance, classification and machine learning may be based on a recurrent neural network (RNN) or a feed forward-only model, such as a convolutional neural network (CNN).

In one embodiment, the machine learning based approach may avoid calibration or zone mappings to classify zones. The model may be trained to determine location information based on training data.

Figure 12:
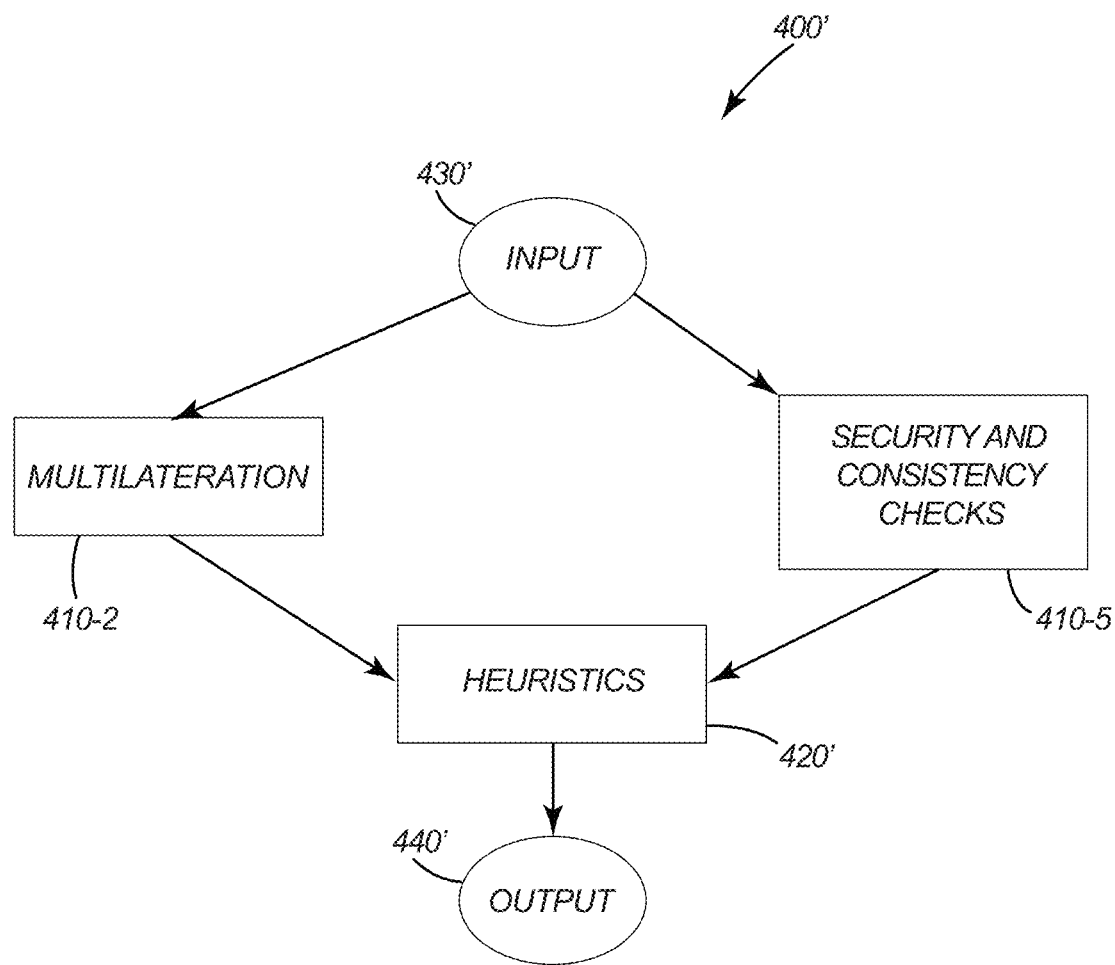
FIG. 12 shows another alternative locator system in accordance with one embodiment.

An alternative embodiment of the locator system is depicted in FIG. 12 and generally designated 400'. The locator system 400' is operable to receive input 430' similar to the locator system 400. The locator system 400' may include a locator 410-2 configured to receive the input 430' and to provide output to a combiner 420' The locator system 400' may also include a locator 410-5 operable to establish security and consistency checks with respect to the input 430' and to provide output to the combiner 420'. The locator 410-5 may provide location information in the form of security and consistency checks. For example, locator 410-5 may provide location information from a secondary source such as GPS information or timing information such as a timestamp from an independent clock or location-based cell phone tower information or any source of information that can be used to verify that the locater system is functioning correctly and has not been compromised. As another example, the locator 410-5 may determine an RTT with respect to communications between devices in the system, such as via channel sounding, to determine location information about the devices relative to each other in a manner that is substantially immune to relay attacks. The RTT in one embodiment may provide a coarse estimate of range that is substantially immune to relay attacks, and which may provide a degree of certainty or corroboration with respect to security of the output from one or more other locators. Other types of information from locator 410-5 may include but is not limited to data related to the physical integrity of one or more components of the system (i.e., tamper identification), temperature information that can be used to verify physical condition and/or regional location of the physical system, and password or key verifiers that indicate proper credentials of the intended user of the system.

The locator system 400' may include a combiner 420' that is configured to generate output 440' based on heuristics applied with respect to the outputs of the locator 410-2 and the locator 410-5. The output 440' from the combiner 420' may be indicative of a location of the mobile device 20 relative to the object 10.

Figure 13:
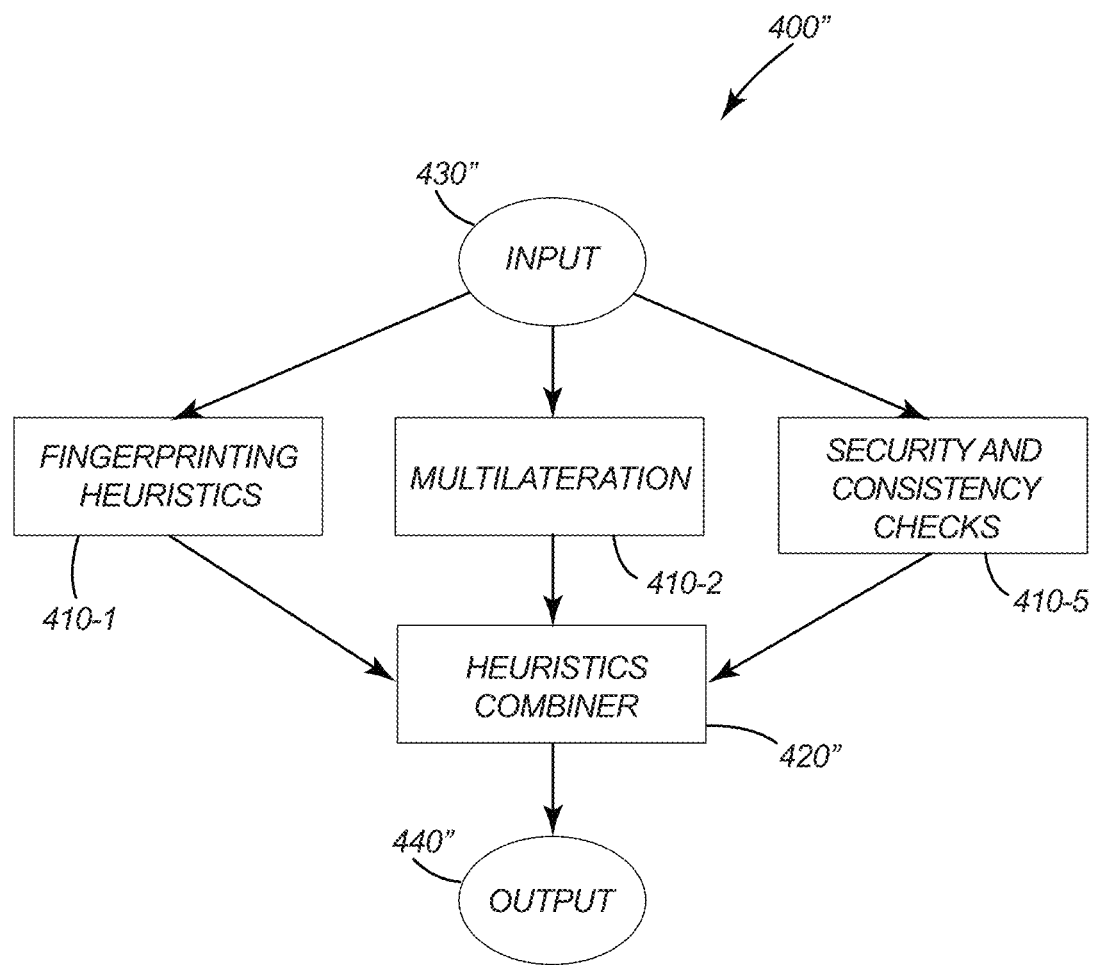
FIG. 13 shows yet another alternative locator system in accordance with one embodiment.

Another alternative embodiment of the locator system is depicted in FIG. 13 and generally designated 400". The locator system 400" is operable to receive input 430" and to generate output 440" indicative of a location of the mobile device 20 relative to the object 10, similar to the locator system 400. The locator system 400" may include a locator 410-1 and a locator 410-2, as well as a locator 410-5, which are configured for generating output based on a variety of location algorithms, including respectively fingerprinting heuristics, multilateration, and security and consistency checks. The combiner 420" may be operable to receive the outputs from the locator 410-1, 410-2, 410-5 to yield the output 440".

One or more aspects of the locator system 400" may implement filtering, such as physics-based filtering for position estimates (e.g., Kalman filtering). For instance, the combiner 420" may implement a Kalman filter with respect to an output generated by the combiner 420" to yield the output 440".

The locator system 400" in the illustrated embodiment, because it implements multiple types of locators 410-1, 410-2, 410-5, may yield output 440" that is more robust with respect to zone classification. For instance, the locator system 400" may be configured to avoid or reduce the number of "dead spots" where, with respect to output from a single locator, fewer remote devices 40 are available for determining accurate location information.

Figure 14:
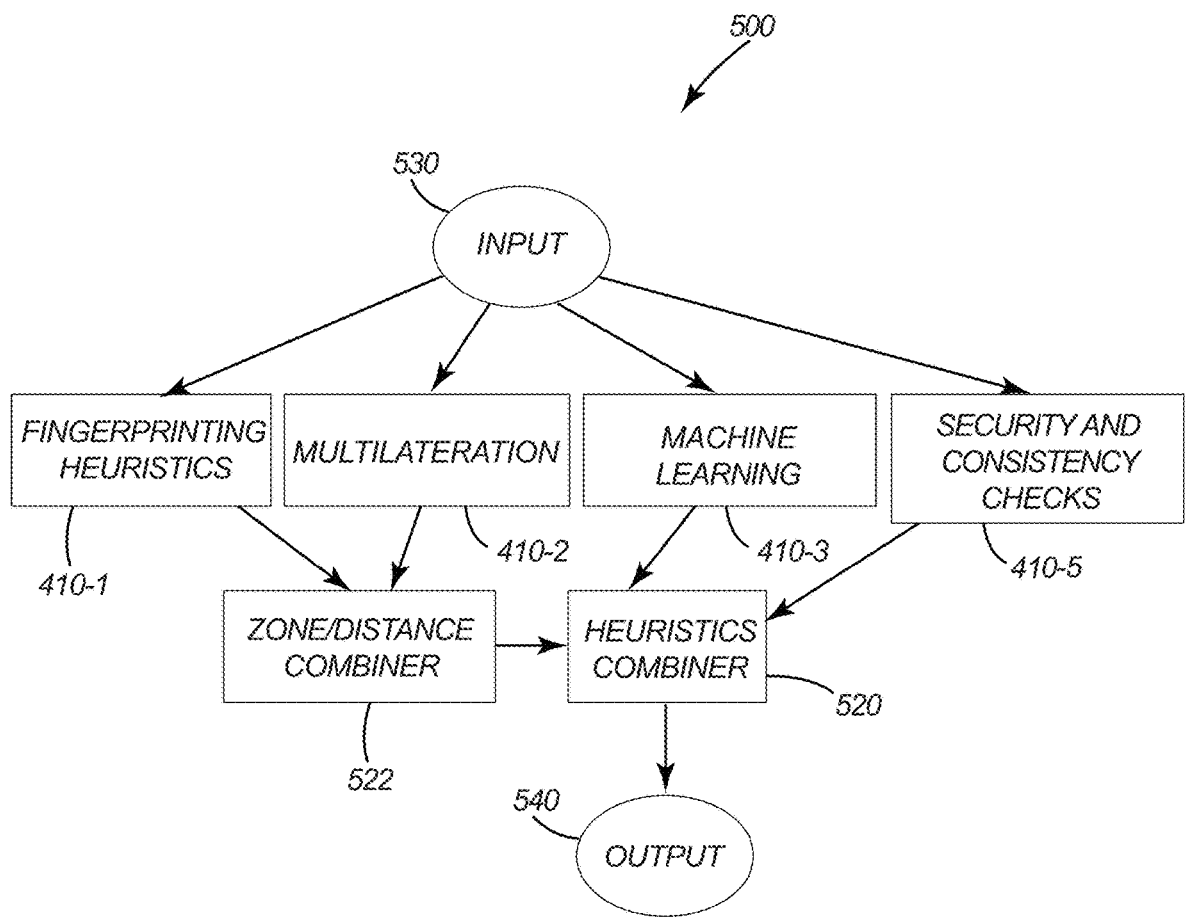
FIG. 14 shows still another alternative locator system in accordance with one embodiment.

Yet another alternative embodiment of the locator system is depicted in FIG. 14 and generally designated 500. The locator system 500 is operable to receive input 530 and to generate output 540 indicative of a location of the mobile device 20 relative to the object 10, similar to the locator system 400 where the input 530 and the output 540 are similar respectively to the input 430 and the output 440.

The locator system 500 may include a plurality of locators 410-1, 410-2, 410-3, 410-5, similar to the locator system 400 described herein. Likewise, each of the locators 410-1, 410-2, 410-3, 410-5 may receive or obtain one or more components of the input 530 as input to a core function of the respective locator.

The locator system 500 depicts aspects described herein with respect to a combiner 520 operable to receive output from another combiner as well as output from one or more locators 410-3, 410-5. In this way, the locator system 500 according to one embodiment may include one or more layers of combiners 520, 522, each of which may receive output from one or more locators or one or more combiners, or a combination thereof.

In the illustrated embodiments, the locator 410-1 and the locator 410-2 output to a combiner 522 in the form of a zone and or distance combiner, which is configured similar to the combiner 420 described herein, to provide an output indicative of a location of the mobile device 20 relative to the object 10. The output of the combiner 522 may be provided to the combiner 520.

The combiner 520 in the illustrated embodiments may receive output from both another combiner 522 and one or more locators 410-3, 410-5, and may analyze these outputs to yield an output 540 indicative of a location of the mobile device 20 relative to the object 10. The combiner 520 in the illustrated embodiment is a heuristic combiner operable to analyze the output from the combiner 522 and the locators 410-3, 410-5 by fusing the outputs from the locators 410-3, 410-5. For example, the combiner 520 may be configured to perform a data fusion process by a voting process where the output is provided by determining the most common answer output by the set of locators 410-3, 410-5. In another example, the combiner 520 may be configured with a probabilistic model that assigns likelihoods to the different outputs of the locators 410-3, 410-5 to produce a weighted output. In another example that may be used in combination with other data fusion methods, the combiner 520 includes a filter such as a Kalman filter that estimates the output as a weighted average of one or more previously predicted outputs and of the new outputs of the one or more locators 410-3, 410-5.

The locator 410-3 in the illustrated embodiment may be a machine learning based locator as described herein. The machine learning aspects of the locator 410-3 may enable estimation of a probability that the mobile device 20 is bound within a candidate zone. The machine learning aspects of the locator 410-3 may also enhance position estimates by being trained with data representative of dead zones (e.g., missing subsets of remote device ranges), and can be trained with data representative of many different environments (e.g., indoors, outdoors, and parking structures). This way, the machine learning aspects of the locator 410-3 may facilitate overcoming potential deficiencies in the output of the combiner 522 with respect to inputs from the locators 410-1, 410-2, which are based on fingerprinting heuristics and multilateration.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A system for determining a location of a portable device relative to an object, said system comprising:
   a first object device and a second object device disposed in fixed positions relative to the object, each of the first and second object devices having an antenna configured to receive communications wirelessly transmitted from the portable device;
   the first object device including a first device controller configured to determine first location information about the portable device relative to the object, the first device controller including a first device locator configured to determine the first location information based on a first signal characteristic of communications transmitted from the portable device, wherein the first device locator is configured to determine the first location information based on multilateration of a plurality of signal characteristics indicative of at least one of time of flight and phase-based ranging of communications received from the portable device, wherein the first signal characteristic is included in the plurality of signal characteristics;
   the second object device including a second device controller configured to determine second location information about the portable device relative to the object, the second device controller including a second device locator configured to determine the second location information based on a second signal characteristic of communications transmitted from the portable device, wherein the second device locator is configured to determine the second location information based on heuristic fingerprinting of a plurality of signal characteristics, wherein the second signal characteristic is included in the plurality of signal characteristics; and
   wherein the location of the portable device relative to the object is determined based on the first and second location information determined respectively by the first and second device locators of the first and second object devices.

2. The system of claim 1 wherein the first signal characteristic is a first type and the second signal characteristic is a second type different from the first type.

3. The system of claim 1 wherein the first signal characteristic is based on a first type of communications transmitted from the portable device, and the second signal characteristic is based on a second type of communications transmitted from the portable device.

4. The system of claim 3 wherein the first type of communications is BTLE communications, and the second type of communications is UWB communications.

5. The system of claim 3 wherein:
the first object device is operable to receive communications transmitted from the portable device and to determine the first signal characteristic based on the communications received from the portable device;
the first object device is operable to receive a third signal characteristic from another device;
the first device locator is configured to determine the first location information based on the first signal characteristic and the third signal characteristic; and
the first signal characteristic and the third signal characteristic are the first type of communications.

6. The system of claim 5 wherein:
the other device is the second object device;
the second object device is operable to receive communications transmitted from the portable device and to determine the second signal characteristic based on the communications received from the portable device;
the second object device is operable to receive a fourth signal characteristic from the first object device;
the second device locator is configured to determine the second location information based on the second signal characteristic and the fourth signal characteristic; and
the second signal characteristic and the fourth signal characteristic are the second type of communications.

7. The system of claim 1 comprising a primary object device having a primary device controller with a primary device locator, the primary device locator configured to determine the location based on the first location information and the second location information.

8. The system of claim 1 comprising:
a third object device disposed in fixed positions relative to the object, the third object device having an antenna configured to receive communications wirelessly transmitted from the portable device;
the third object device including a third device controller configured to determine third location information about the portable device relative to the object, the third device controller including a third device locator configured to determine the third location information based on a third signal characteristic of communications transmitted from the portable device; and
the location of the portable device relative to the object is determined based on the first, second, and third location information determined respectively by the first, second, and third device locators of the first, second, and third object devices.

9. The system of claim 1 wherein the second device locator is configured to determine the second location information based on output from a machine trained model, wherein a plurality of signal characteristics are provided as inputs to the machine trained model, wherein the second signal characteristic is included in the plurality of signal characteristics.

10. The system of claim 1 wherein the first device locator is configured to determine the first location information based on multilateration of a plurality of signal characteristics indicative of signal strength of communications received from the portable device, wherein the first signal characteristic is included in the plurality of signal characteristics.

11. The system of claim 1 wherein:
the first device locator is configured to determine the first location information based on output from a first machine trained model;
the second device locator is configured to determine the second location information based on output from a second machine trained model;
the first machine trained model is operable to provide output indicative of position information for the portable device with respect to the object; and
the second machine trained model is operable to provide output indicative of a zone classification for the portable device with respect to the object.

12. A method of determining location of a portable device relative to an object, the method comprising:
generating, by a first locator of a first object device, first location information about the portable device relative to the object based on communications with the portable device, wherein the first device locator is configured to determine the first location information based on multilateration of a plurality of signal characteristics indicative of at least one of phase-based ranging and time of flight of communications received from the portable device;
generating, by second locator of a second object device, second location information about the portable device relative to the object based on communications with the portable device, wherein the second device locator is configured to determine the second location information based on heuristic fingerprinting of a plurality of signal characteristics; and
generating location information about the portable device relative to the object based on the first and second location information determined respectively by the first and second locators of the first and second object devices.

13. The method of claim 12 wherein said generating the first location information includes determining the first location information based on a first signal characteristic of communications transmitted from the portable device.

14. The method of claim 13 wherein the communications transmitted from the portable device are communicated in conjunction with a communication link established between the portable device and an object device other than the first object device.

15. The method of claim 12 wherein said generating the second location information includes determining the second location information based on a second signal characteristic of communications transmitted from the portable device.

16. The method of claim 15 wherein the communications transmitted from the portable device are communicated in conjunction with a communication link established between the portable device and an object device other than the second object device.

17. The method of claim 12 wherein the first and second locators are different such that a core function of the first and second locators are different.

18. A locator system operable to determine a location of a portable device relative to an object, the locator system comprising:
- a first locator configured to generate first location information based on communications with the portable device, wherein the first device locator is configured to determine the first location information based on multilateration of a plurality of signal characteristics indicative of at least one of phase-based ranging and time of flight of communications received from the portable device;
- a second locator configured to generate second location information based on communications with the portable device, wherein the second device locator is configured to determine the second location information based on heuristic fingerprinting of a plurality of signal characteristics;
- a combiner operable to receive the first location information and the second location information, the combiner configured to generate location information indicative of the location of the portable device relative to the object based on the first location information and the second location information; and
- wherein the first locator and the second locator are provided in separate devices disposed at first and second respective positions on the object.

19. The locator system of claim 18 wherein the first locator determines the first location information based on a first signal characteristic of communications transmitted from the portable device, and wherein the second locator determines the second location information based on a second signal characteristic of communications transmitted from the portable device.

20. The locator system of claim 19 wherein the first locator and the second locator are operable to determine respectively the first and second location information based on different types of communications transmitted from the portable device.

* * * * *